(12) United States Patent
Kawakami et al.

(10) Patent No.: US 8,255,715 B2
(45) Date of Patent: Aug. 28, 2012

(54) STORAGE SYSTEM AND POWER CONTROL METHOD THEREOF WITH MODE SELECTION DEFINED BY TIMEOUT PERIOD AND POWER SUPPLY

(75) Inventors: Norihiko Kawakami, Sagamihara (JP); Kenta Shiga, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 362 days.

(21) Appl. No.: 12/527,455

(22) PCT Filed: May 25, 2009

(86) PCT No.: PCT/JP2009/059925
§ 371 (c)(1),
(2), (4) Date: Aug. 17, 2009

(87) PCT Pub. No.: WO2010/137180
PCT Pub. Date: Dec. 2, 2010

(65) Prior Publication Data
US 2011/0185201 A1 Jul. 28, 2011

(51) Int. Cl.
*G06F 1/32* (2006.01)
(52) U.S. Cl. ........................ 713/320; 713/324
(58) Field of Classification Search ........... 713/300–340
See application file for complete search history.

(56) References Cited

U.S. PATENT DOCUMENTS

| | | | |
|---|---|---|---|
| 6,233,693 B1 | 5/2001 | Berglund et al. | |
| 6,286,108 B1 * | 9/2001 | Kamo et al. | 713/330 |
| 6,868,501 B2 * | 3/2005 | Saitou et al. | 713/330 |
| 7,134,032 B2 * | 11/2006 | Yamada et al. | 713/324 |
| 7,275,166 B2 * | 9/2007 | Kaiju et al. | 713/320 |
| 7,793,042 B2 * | 9/2010 | Reeves et al. | 711/114 |
| 7,882,373 B1 * | 2/2011 | More et al. | 713/300 |
| 8,028,126 B2 * | 9/2011 | Bougaev et al. | 711/112 |
| 2003/0212857 A1 * | 11/2003 | Pacheco et al. | 711/114 |
| 2005/0259345 A1 | 11/2005 | Hakamata et al. | |
| 2005/0273638 A1 | 12/2005 | Kaiju et al. | |
| 2009/0055520 A1 | 2/2009 | Tabata et al. | |
| 2010/0005329 A1 * | 1/2010 | Innan et al. | 713/324 |
| 2010/0313043 A1 * | 12/2010 | Tsukada et al. | 713/320 |

FOREIGN PATENT DOCUMENTS

| | | |
|---|---|---|
| JP | 2000-10678 A | 1/2000 |
| JP | 2000-293314 A | 10/2000 |

* cited by examiner

*Primary Examiner* — Raymond Phan
(74) *Attorney, Agent, or Firm* — Mattingly & Malur, PC

(57) ABSTRACT

In the process of controlling a plurality of storage devices 190 in any one of a normal mode and a plurality of power-saving modes (such as standby and LRPM), a controller 110 selects the storage devices whose mode should be shifted from the normal mode to any of the power-saving modes; and before shifting to control of the selected storage devices in any of the power-saving modes, the controller calculates time and electric power required to make the selected storage devices return from each power-saving mode to the normal mode; and based on each calculated value, the controller sets a combination of power-saving modes and the number of storage devices that satisfy the return conditions defined by the host timeout period and the supplied power; and then, the controller controls the selected number of storage devices in the set combination of power-saving modes.

13 Claims, 18 Drawing Sheets

FIG.7

| HDD TYPE NAME | HDD VENDOR | POWER MODE | POWER MODE NO. | POWER CONSUMPTION (W) | RETURN POWER (W) | RECOVERY TIME (SECONDS) |
|---|---|---|---|---|---|---|
| Type1 | COMPANY A | R/W | 5 | 13.6 | 0 | 0 |
| | | Idle | 4 | 9 | 0 | 0 |
| | | Unload | 3 | 8.7 | 3 | 0.7 |
| | | LRPM | 2 | 4.5 | 15 | 4 |
| | | Standby | 1 | 2 | 30 | 15 |
| | | Sleep | 0 | 1.8 | 30 | 20 |
| | | Power Off | 0 | 0 | 35 | 25 |
| Type2 | COMPANY B | R/W | 5 | 13.6 | 0 | 0 |
| | | Idle | 4 | 9 | 0 | 0 |
| | | Standby | 1 | 2 | 30 | 15 |
| | | Sleep | 0 | 1.8 | 30 | 20 |
| | | Power Off | 0 | 0 | 30 | 25 |
| Type3 | COMPANY A | R/W | 5 | 13.6 | 0 | 0 |
| | | Idle | 4 | 9 | 0 | 0 |
| | | Standby | 1 | 2 | 30 | 15 |
| | | Sleep | 0 | 1.8 | 30 | 20 |
| | | Power Off | 0 | 0 | 30 | 25 |
| ... | | | | | | |

|  | CHASSIS A | CHASSIS B |
|---|---|---|
| CHASSIS RATED POWER | 800W | 500W |
| POWER CONSUMPTION (EXCEPT HDDs) | 400W | 50W |
| HDD OPERATION POWER | 300W | 100W |
| AVAILABLE RETURN POWER | 100W | 350W |

FIG.11

| HOST | TIMEOUT | CORRESPONDING LU | CORRESPONDING RG |
|---|---|---|---|
| DEFAULT | 30s | | |
| HOST A | 30s | LU0 | RG1 |
| HOST B | 60s | LU1 | RG2 |
| HOST C | 60s | LU2 | RG1 |
| HOST D | 5s | LU10 | RG3 |
| ... | | | |

FIG.14

| HDD ID | TYPE NAME | RG | POWER MODE | POWER-SAVING SETTING | HDD LOCATION |
|---|---|---|---|---|---|
| 1 | Type1 | 0 | Standby | ON | CHASSIS A |
| 2 | Type1 | 1 | Standby | ON | CHASSIS A |
| 3 | Type1 | 1 | Standby | ON | CHASSIS A |
| 4 | Type1 | 1 | Standby | ON | CHASSIS A |
| 5 | Type1 | 1 | Standby | ON | CHASSIS A |
| 6 | Type1 | 1 | Standby | ON | CHASSIS A |
| 7 | Type1 | 1 | Standby | ON | CHASSIS A |
| 8 | Type1 | 1 | Standby | ON | CHASSIS A |
| 9 | Type1 | 1 | Standby | ON | CHASSIS A |
| 10 | Type1 | 1 | Standby | ON | CHASSIS A |
| 11 | Type2 | 1 | LRPM | ON | CHASSIS A |
| 12 | Type2 | 1 | LRPM | ON | CHASSIS A |
| 13 | Type2 | 1 | LRPM | ON | CHASSIS A |
| 14 | Type2 | 1 | LRPM | ON | CHASSIS A |
| 15 | Type2 | 1 | LRPM | ON | CHASSIS A |
| 16 | Type2 | 1 | Standby | ON | CHASSIS B |
| 17 | Type3 | 1 | Standby | ON | CHASSIS B |
| 18 | Type3 | 1 | Standby | ON | CHASSIS B |
| 19 | Type3 | 1 | Standby | ON | CHASSIS B |
| 20 | Type3 | 1 | Standby | ON | CHASSIS B |
| ... | | | | | |

STORAGE SYSTEM AND POWER CONTROL METHOD THEREOF WITH MODE SELECTION DEFINED BY TIMEOUT PERIOD AND POWER SUPPLY

TECHNICAL FIELD

The present invention generally relates to a technique of controlling storage devices according to power modes.

BACKGROUND ART

In order to reduce power consumption of a storage system, there is a method of, for example, reducing power consumption by shifting a power mode of HDDs (hard Disk Drives) with no access to a power-saving mode when no I/O (input/output) is made to the storage system for a certain period of time (see Patent Document 1). There is another method of calculating and activating the maximum number of HDDs that can be activated, based on a power supply ability of the storage system when a host I/O is made to HDDs that have spun down (see Patent Document 2).

RELATED ART DOCUMENTS

[Patent Document 1] Japanese Patent Application Laid-Open (Kokai) Publication No. 2000-293314
[Patent Document 2] Japanese Patent Application Laid-Open (Kokai) Publication No. 2000-10678

DISCLOSURE OF THE INVENTION

Generally, a storage system consumes electric power by making HDDs mounted therein spin all the times when the storage system is in operation, regardless of access or no access made to the storage system.

Meanwhile, in Patent Document 1, the power-saving effect is enhanced by reducing power consumption for operation of HDDs in an unused state by controlling HDDs to which no access is made, to make them spin down. However, if HDDs in a target RAID (Redundant Array of Inexpensive Disks) group is controlled, when making them shift to a power-saving mode, to spin them down uniformly and stop their spinning, and when an I/O request is sent from a host, and if the target HDDs spin up from the spinning stopped state, a response may not be returned within a host timeout period.

If the number of spin-up target HDDs is large, all the HDDs may not be able to spin up at once because of limitations on supplied power for the storage system. In this case, the spin-up target HDDs can spin up within the limitations on the supplied power for the storage system if the spin-up target HDDs are divided and then made to spin up separately. However, the larger the division number becomes, the longer the time required for spin-up becomes. If the time required for spin-up becomes too long, a response cannot be made within the host timeout period.

When the number of spin-up target HDDs is large, Patent Document 2 provides the effect of reducing host response time by spinning up the maximum number of HDDs that can spin up within the limitations on the supplied power for the storage system.

However, there is a limitation for use on the supplied power for the storage system. If all the HDDs are made to spin up at the same time and the power to be consumed exceeds the limits of the supplied power for the storage system, it is necessary to divide the spin-up target HDDs into some stages and make them spin up in separate stages.

On the other hand, if a power mode for the spin-up target HDDs is set to an LRPM (low revolutions per minute) mode in power-saving modes in order to prevent host timeout, when the HDDs at an LRPM state are made to return to the normal mode, the time required for returning to the normal mode can be shorter than the time required to spin up HDDs in a spin-down state. Therefore, if the HDDs to be shifted to the power-saving mode are controlled in the LRPM mode, and when a host I/O is received, it is possible to reduce the time required to make the target HDDs return to the normal mode before the storage system becomes ready for processing the relevant command. However, since the target HDDs to be shifted to the power-saving modes are in the LRPM state, the power-saving effect will be lower than the case where the HDDs are controlled to spin down.

As described above, there is a trade-off relationship between the power-saving effect and the host response time in the conventional methods for controlling power modes for HDDs, and the problem of the conventional methods is that they cannot optimally provide users with the effect they want.

It is an object of the present invention to provide a storage system and its power control method capable of setting a combination of power-saving modes that satisfies return conditions defined by host timeout and supplied power, and controlling storage devices in the power-saving modes according to the setting.

In order to achieve the above-described object, the present invention is characterized in that in the process of controlling a plurality of storage devices according to any one of a normal mode and a plurality of power-saving modes, the storage devices, which should be controlled in any one of the power-saving modes, are selected from among the storage devices controlled in the normal mode; and before shifting to control of the selected storage devices in any one of the power-saving modes, a combination of power-saving modes that satisfies return conditions to the normal mode is set; and then the selected storage devices are controlled in the set combination of power-saving modes.

EFFECT OF THE INVENTION

As described above, the present invention can prevent host timeout and enhance the power-saving effect.

BRIEF DESCRIPTION OF THE DRAWINGS

FIG. 7 is a configuration diagram of an HDD specification management table for managing HDD specifications according to the invention;

FIG. 11 is a configuration diagram of a timeout management table for managing host timeout period according to the invention;

FIG. 14 is a configuration diagram of an HDD operation information management table for managing the HDD configuration and settings according to the third embodiment of the invention;

BEST MODE FOR CARRYING OUT THE INVENTION

Some embodiments of the present invention will be explained below with reference to the attached drawings. Incidentally, if elements of the same type are not specifically distinguished, only the same parent number is used; and if elements of the same type are distinguished, a combination of the parent number and a child symbol is used.

First Embodiment

The first embodiment of the present invention will be explained below. According to the first embodiment, storage devices which should be shifted from a normal mode to a power-saving mode are selected from among a plurality of storage devices; and before shifting to control of the selected storage devices in any one of the power-saving modes, time and electric power required to make the storage devices return from each power-saving mode to the normal mode are calculated; and based on each calculation value, a combination of power-saving modes and the number of storage devices that satisfy return conditions defined by host timeout period and supplied power for the storage system are set; and the selected number of storage devices are controlled in the set combination of power-saving modes.

Figure 1:
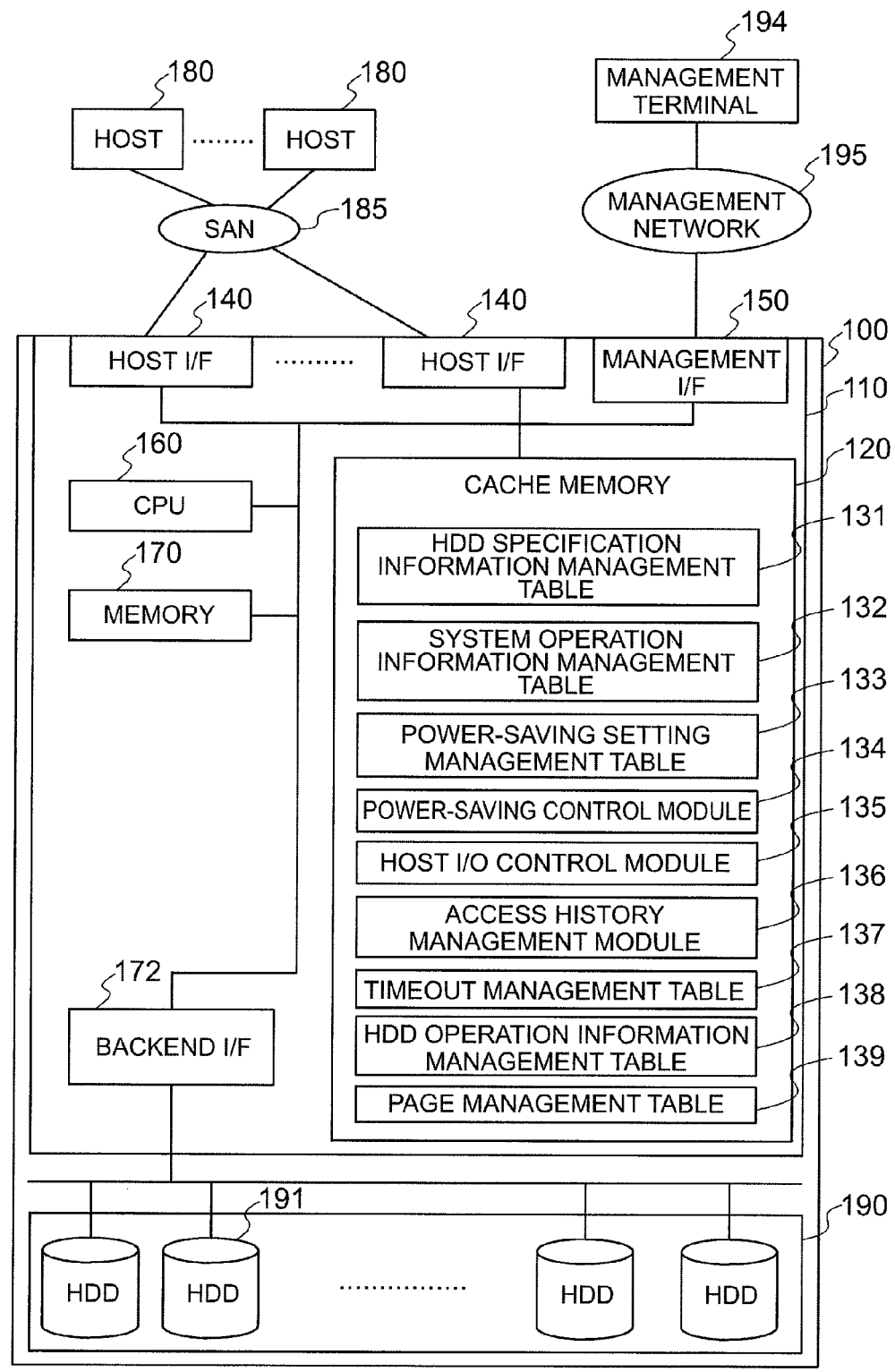
FIG. 1 is a configuration diagram of a storage system according to the first embodiment of the present invention.

FIG. 1 is a configuration diagram of a storage system 100 according to the first embodiment of the invention.

The storage system 100 is connected to one or more networks. For example, a plurality of hosts 180 and the storage system 100 are connected to a SAN (Storage Area Network) 185 serving as a first network. Also, a management terminal 194 and the storage system 100 are connected to a management network 195 serving as a second network.

Each host 180 is a computer (host computer) that issues an I/O request (read request or write request) to the storage system 100. The management terminal 194 is a computer for managing the storage system 100.

The storage system 100 includes a controller 110 and a storage device group 190. The storage device group 190 is composed of one or more HDDs 191. Incidentally, other storage devices such as flash memories may also be included in addition to the HDDs 191.

The controller 110 accepts an I/O request issued from the host 180 to the storage system 100 and accesses one or more HDDs 191, the access target(s), when processing the I/O request. The controller 110 includes one or more host I/Fs (Interfaces) 140, management I/Fs 150, CPUs (Central Processing Units) 160, memories 170, backend I/Fs 172·and cache memories 120.

Each host I/F 140 is in charge of communications with external devices such as a host 180 via the SAN 185 and accepts an I/O request from the host 180.

The management I/F 150 is in charge of communications with external devices such as the management terminal 194 via the management network 195 and accepts a management command from the management terminal 194 to the storage system 100.

The backend I/F 172 is an interface circuit for the controller 110 to communicate with the storage device group 190. The backend I/F 172 controls the operation, such as the number of revolutions, of the HDDs 191 under the control of the controller 110.

The cache memory 120 is composed of, for example, a nonvolatile memory. This cache memory 120 stores an HDD specification management table 131, a system operation information management table 132, a power-saving setting management table 133, a power-saving control module 134, a host I/O control module 135, an access history management module 136, a timeout management table 137, an HDD operation information management table 138, and a page management table 139.

Programs stored in the cache memory 120 or the storage device group 190 are loaded to the memory 170 and executed by the CPU 160. The power-saving control module 134 is a program for managing the power-saving setting for the storage system 100 and controlling the storage system 100 for the power-saving purpose, for example, controlling the number of revolutions of the HDDs 191.

The host I/O control module 135 is a program for executing processing relating to I/O requests from the host 180. The access history management module 136 is a program for managing how frequently and at which storage area 190 or HDD 191 an I/O request is issued from the host 180.

Figure 2:
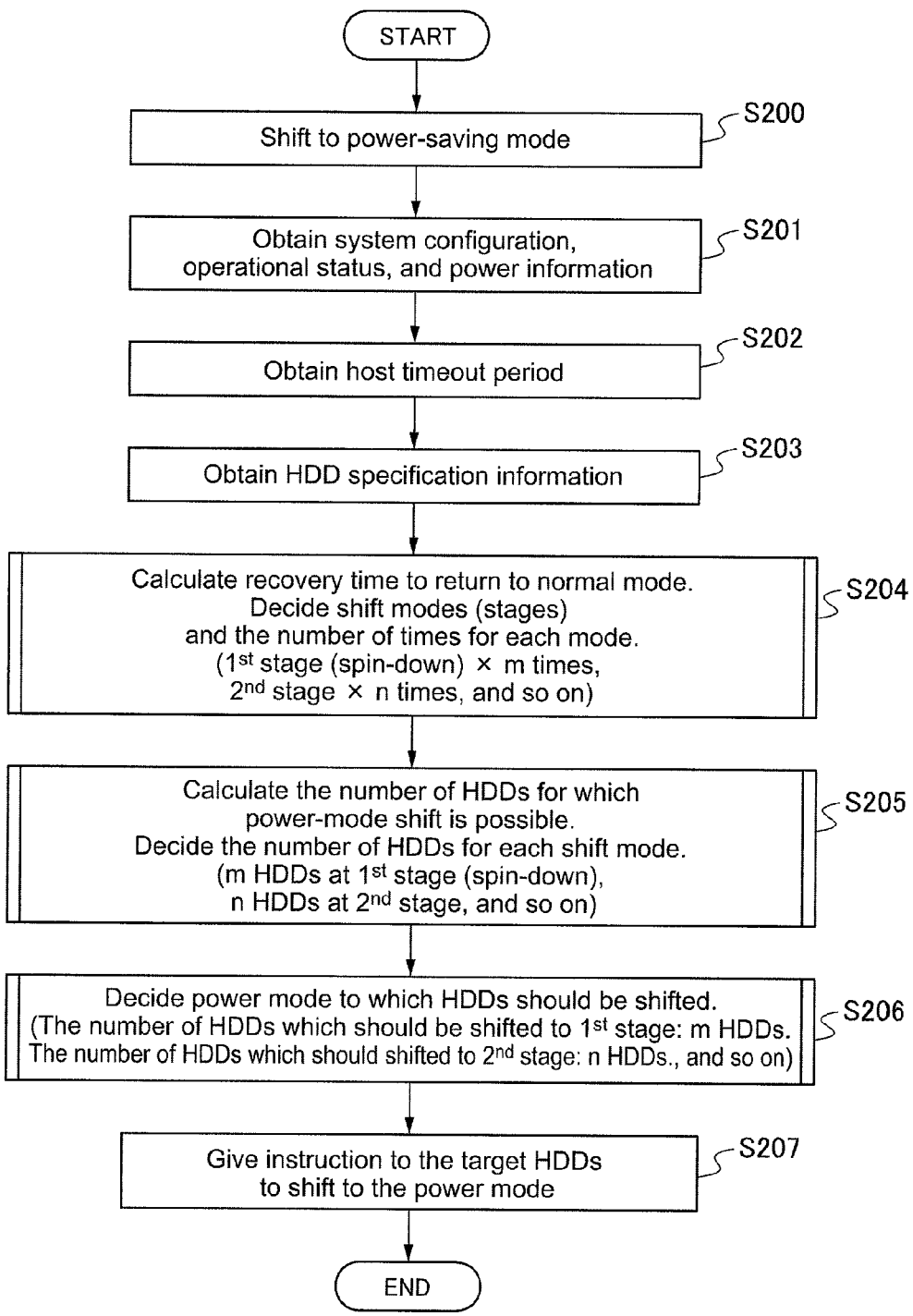
FIG. 2 is a flowchart illustrating processing for shifting the storage system to a power-saving mode.

FIG. 2 is a flowchart illustrating processing executed by the storage system 100 for shifting to a power-saving mode.

The processing for shifting to the power-saving mode is executed when the power-saving setting is effectively made for the storage system 100. As a specific example, when the CPU 160 executes the power-saving control module 134, the power-saving control module 134 checks if the value of the power-saving setting recorded in the power-saving setting management table 133 (see FIG. 10) is "ON" or not.

If the power-saving control module 134 refers to the power-saving setting management table 133 and the power-saving setting is set "ON" for the storage system 100, shift processing for the shift target storage device group 190 that satisfies conditions for shifting to the power-saving mode is started in step S200. As a specific example, processing in step S201 and the following steps is executed.

In step S201, the power-saving control module 134 reads the system operation information management table 132 (see FIG. 8) and the HDD operation information management table 138 (see FIG. 12), thereby obtaining the system configuration, system operational status, and power information.

The system configuration is information indicating, for example, how many chassis are connected in the storage system 100 and how many HDDs 191 are mounted in a chassis. The operational status is information indicating, for example, which HDD 191 is operating in the normal mode or which HDD 191 is operating in the power-saving mode.

The "normal mode" herein used means the state in which in response to an I/O request from the host 180, the controller 110 can access (read-access or write-access) the relevant HDD 191 and the HDD 191 is in a power mode such as R/W (Read/Write) or Idle. The "power-saving mode" means the state in which the controller 110 cannot access the relevant HDD 191 and the HDD 191 is in a power-saving state with less power consumption than the normal mode, for example, Unload, LRPM, Standby, or Sleep power mode. Incidentally, the R/W, Idle, Unload, LRPM, Standby, and Sleep power modes will be explained later.

The power information is information about the amount of supplied power for the storage system 100, the amount of supplied power on a storage chassis basis, and other information such as power consumption of the controller 110 and power consumption of the storage device group 190. These pieces of power information are managed as information that can be used when the storage device group 190 returns from the power-saving mode to the normal mode.

Next, in step S202, the power-saving control module 134 reads information about the host timeout from the timeout management table 137 (see FIG. 11).

In step S203, the power-saving control module 134 reads specification information about the HDDs 191 from the HDD specification management table 131 (see FIG. 7).

In step S204, the power-saving control module 134 calculates the time to return from the power-saving mode to the normal mode. Based on this calculation result, the power-saving control module 134 determines which power mode among the power modes, to which the HDDs 191 are to be shifted when shifting to the power-saving mode, can be used before returning to the normal mode in which a host I/O can be processed.

In step S205, the power-saving control module 134 calculates how many HDDs 191 can be shifted to each of the shift target power modes, based on electric power necessary for returning to the normal mode.

In step S206, the power modes to which the relevant HDDs are to be actually shifted and the number of HDDs 191 for each power mode are decided based on the results in steps S204 and S205 when shifting to the power-saving mode.

Finally in step S207, the power-saving control module 134 gives an instruction to each HDD of the HDD 191 group which should be shifted to the power-saving mode to shift to the power mode based on the result decided in step S206.

Figure 3:
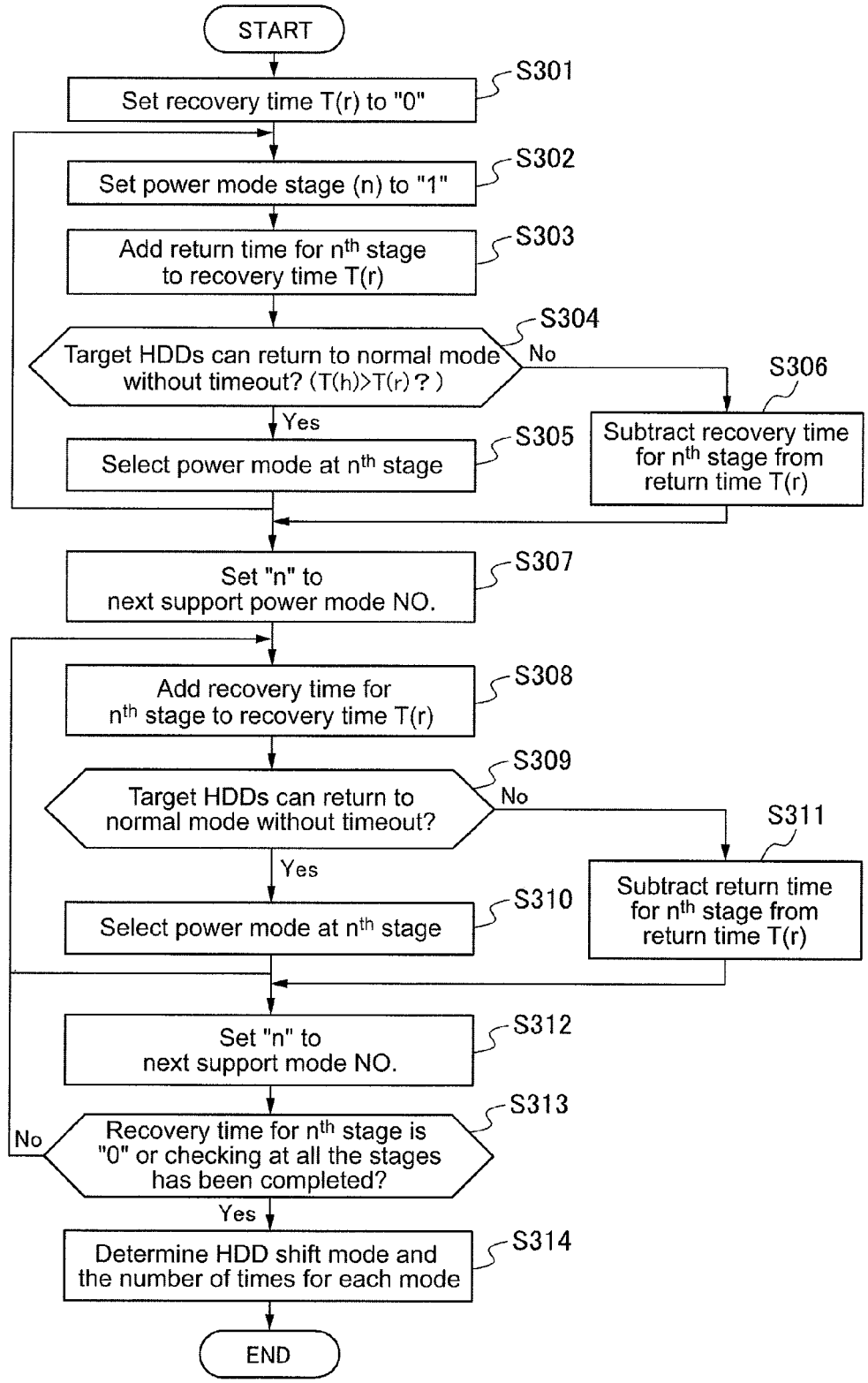
FIG. 3 is a flowchart illustrating processing for calculating recovery time to make the relevant HDDs return from a power mode, to which the relevant HDDs have been shifted, back to a normal mode according to the first embodiment of the invention.

FIG. 3 is a flowchart illustrating processing for calculating the recovery time to return to the normal mode. In this processing, the CPU 160 executes the power-saving control module 134 to calculate the number of stages of the shift target power mode.

The processing for calculating the recovery time to return to the normal mode is the processing executed in step S204 in FIG. 2.

In step S301, information about recovery time from the power-saving mode to the normal mode is managed and recovery time T(r) is set to "0."

In step S302, the value "n" for $n^{th}$ stage as a power mode stage is set to "1." The value "n" for $n^{th}$ stage is the value of power mode NO. (number). The power mode NO. is a "power mode NO." field 704 among items managed by the HDD specification management table 131 (see FIG. 7).

Next, in step S303, the recovery time for the first stage is added to the recovery time T(r). For example, the power mode corresponding to power mode NO. "1" in the HDD specification management table 131 is set to "Standby" in this embodiment and, therefore, the recovery time "15 seconds" from Standby is added to the current T(r) value "0."

In step S304, whether or not the shift target HDDs 191 to be shifted to the power-saving mode can return to the normal mode without timeout in the recovery time calculated in step S302 is judged. Regarding the host timeout period, the host timeout period (T(h)) for the host 180 corresponding to the target LU (Logical Unit) and RG (RAID Group) to be shifted to the power-saving mode is obtained from the timeout management table 137 (see FIG. 11).

In this embodiment, it takes 15 seconds to return from Standby at the first stage. If the storage device group 190 to be shifted from the normal mode to the power-saving mode corresponds to RG1, host A and host B are the targets. In this case, the target with shorter host timeout period is used as the basis, so that the timeout period "30 seconds" for host A becomes the basis. As a result, it is determined that the target HDD 191 group can return to the normal mode without timeout.

If it is determined as a result of the judgment in step S304 that the HDDs 191 cannot return to the normal mode without timeout, the recovery time for the first stage is subtracted, in step S306, from the value of the total recovery time T(r) for which addition was made in step S303, the result of subtraction is set to the T(r) value, and the processing proceeds to step S307.

On the other hand, if it is determined as a result of the judgment in step S304 that it is possible to return to the normal mode without timeout, the first stage power mode is selected in step S305 as the mode to which the HDDs 191 should be shifted. Then, the processing returns to step S302, the power mode stage is set to "1" again, and the recovery time for the first stage is added to the recovery time T(r). As a result of addition of the recovery time for the first stage in the first step S303, the T(r) value is "15" (T(r)=15); and then the recovery time "15 seconds" from the first stage is added again to the recovery time T(r), which results in "30 seconds" (T(r)=30). Similarly, whether the HDDs 191 can return to the normal mode without timeout is judged in step S304, and the same processing as that executed at the first time is then executed.

In step S307, the power mode supported at the next stage is determined. Therefore, "n" is set to the next stage power mode NO. Referring to the HDD specification management table 131 (FIG. 7), "LRPM" is set as the second stage which is the next stage of the first stage "Standby" in this embodiment. Thus, "n" is set to "2."

In step S308, the recovery time at the $n^{th}$ stage is added to the recovery time T(r).

In step S309, whether or not the HDDs 191 can return to the normal mode without timeout when the recovery time is T(r) is judged in the same manner as in step S304.

If it is determined as a result of the judgment in step S309 that the HDDs 191 cannot return to the normal mode without timeout, the recovery time for the $n^{th}$ stage is subtracted, in step S311, from the value of the total recovery time T(r) for which addition was made in step S308, the result of subtraction is set to the T(r) value, and the processing proceeds to step S312.

On the other hand, if it is determined as a result of the judgment in step S309 that it is possible to return to the normal mode without timeout, the $n^{th}$ stage power mode is selected in step S310 as the mode to which the HDDs 191 should be shifted. Then, the processing returns to step S308, the power mode stage is set to the same "n" again, the recovery time at the $n^{th}$ stage is added to the recovery time T(r), and the timeout judgment is conducted in the same manner.

Next, in step S312, the power mode supported at the next stage is judged in order to check timeout regarding the next stage power mode. Therefore, "n" is set to the power mode NO. at the next stage. For example, referring to the HDD specification management table 131 (FIG. 7), "Unload" is set as the third stage which is the next stage of the second stage "LRPM" in this embodiment. Therefore, "3" is set to "n."

In step S313, whether or not the recovery time for the $n^{th}$ stage is "0" seconds or whether checking all the stages of the power modes supported by the target HDDs 191 to be shifted to the power-saving mode has been completed or not is judged. Referring to the HDD specification management table 131 (FIG. 7), the recovery time for "Idle" which is power mode NO. "4," and the recovery time for "R/W" which is power mode NO. "5" are "0 seconds" in this embodiment. These power modes are the normal modes in which when the storage system 100 receives a host I/O, it can immediately process the I/O request. For example, the recovery time from "Unload" which is the power mode with "n" being set to "3" is "0.7 seconds" in this embodiment and, therefore, the recovery time in this case is not 0 seconds.

If it is determined as a result of the judgment in step S313 that the recovery time for the $n^{th}$ stage is not 0 seconds, or that checking all the stages has not been completed, the processing proceeds to step S308 and whether timeout takes place in the case of the recovery time for the $n^{th}$ stage is judged repeatedly in the same manner.

Finally, if the recovery time for the $n^{th}$ stage is 0 seconds or if checking all the stages of the power modes supported by the target HDDs 191 to be shifted to the power-saving mode has been completed, the types of the power-saving mode to which the HDDs should be shifted (HDD shift modes) and the number of times for each power-saving mode are determined in step S314, thereby terminating the processing of this routine.

Figure 4:
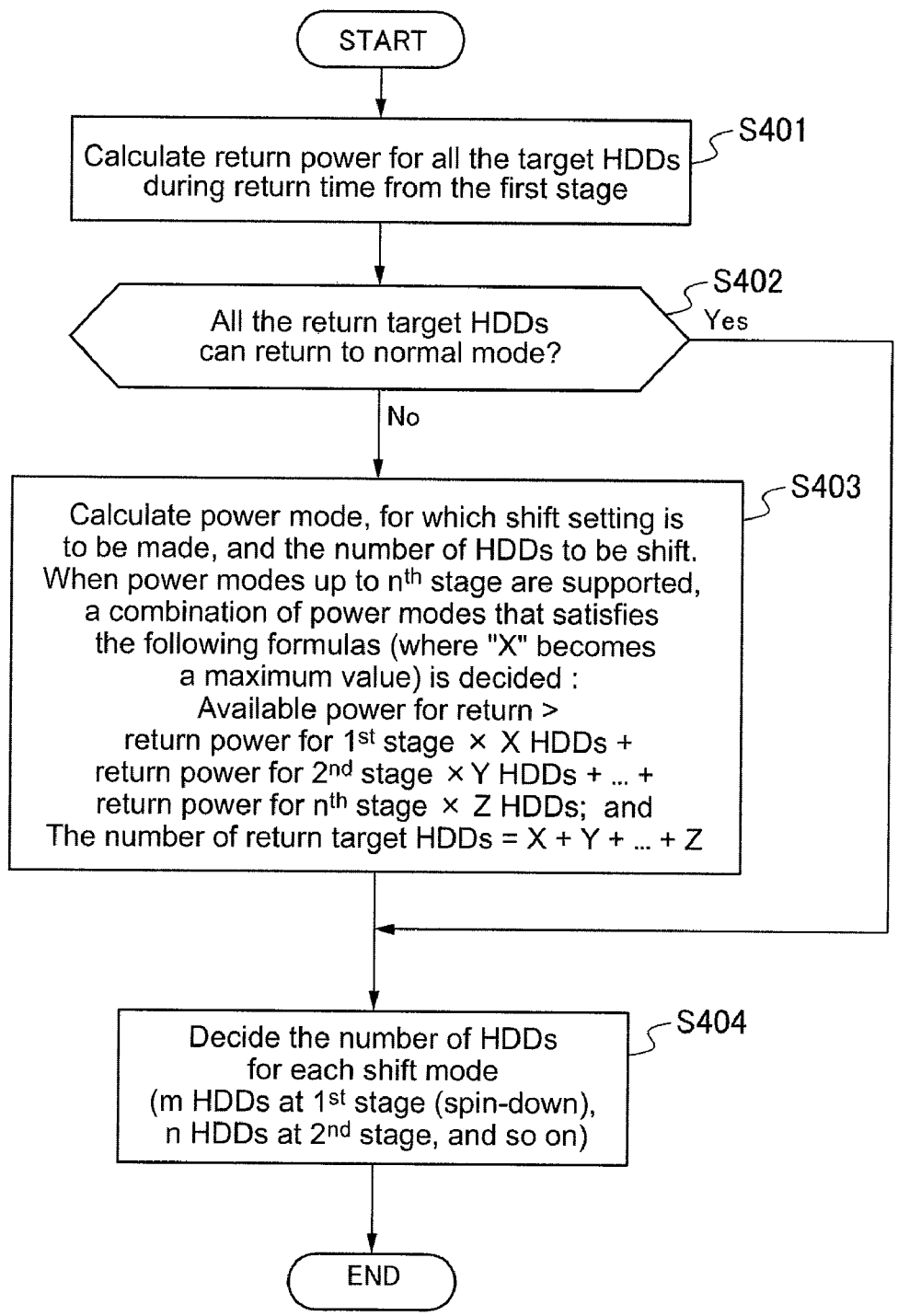
FIG. 4 is a flowchart illustrating processing for calculating power mode allocation according to which the power mode for the relevant HDD is shifted according to the first embodiment of the invention.

FIG. 4 is a flowchart illustrating processing for calculating how many HDDs 191 can be shifted to which power mode when shifting them to the power-saving mode, based on the result of calculation of peak power consumed when returning from the power-saving mode to the normal mode.

This processing is the processing executed in step S205 in FIG. 2, in which the CPU 160 executes the power-saving control module 134.

In step S401, the power-saving control module 134 calculates the electric power consumed by all the HDDs 191, which are return targets, when returning from the first stage power mode. If the HDD ID 1201 (FIG. 12) of the shift target HDDs 191 to be shifted to the power-saving mode are "1" to "15" in this embodiment, the above-described power consumption is "30 W×15 HDDs 191" which results in a total of 450 W.

In step S402, whether all the return target HDDs 191 can return to the normal mode or not is judged based on the result of calculation in step S401 and comparison between the supplied power for the storage system 100 and the power that can be used by the HDDs 191 for returning to the normal mode.

If it is determined as the result of judgment that all the HDDs 191 can return to the normal mode, the processing proceeds to step S404.

On the other hand, if it is determined that all the HDDs 191 cannot return to the normal mode, the power mode to be shifted to the power-saving mode and the number of HDDs to be shifted are calculated in step S403.

In step S403, assuming that power modes from the first stage power mode to the $n^{th}$ stage power mode are supported, a combination of power modes that will exhibit the maximum power-saving effect is decided within available return power on a power management unit basis, such as on the basis of the storage system or on a chassis basis. The shift target HDDs 191 to be shifted to the power-saving mode are sorted sequentially with regard to all the supported power modes from the first stage power mode to the $n^{th}$ stage power mode. In this case, it is necessary to satisfy the following conditions in order to support the power modes up to the $n^{th}$ stage power mode:

Available return power>return power for $1^{st}$ stage×X HDDs+return power for $2^{nd}$ stage× Y HDDs+ . . . +return power for $n^{th}$ stage×Z HDDs; and (1)

The number of return (shift) target HDDs 191=X+ Y+ . . . +Z (2)

A combination having a relationship of "X>Y> . . . >Z" should be selected as a high priority.

However, if the host response time is set as a higher priority than the supplied power for the storage system 100, the condition (1) is changed and a total of return power is calculated due to the limitation on the supplied power for the storage system 100.

Available return power>return power for $1^{st}$ stage×X HDDs+return power for $2^{nd}$ stage× Y HDDs+ . . . +return power for $n^{th}$ stage×Z HDDs (1')

Finally in step S404, the number of the shift target HDDs 191 for each power mode is decided with regard to each power mode which should be shifted to the power-saving mode.

In the case, for example, where the available return power for chassis B 802 (FIG. 8) is "350 W" and fifteen HDDs 191 of the HDD type "Type 1" as recorded in the HDD specification management table 131 (see FIG. 7) are to be shifted in this embodiment, if ten HDDs are set to the first stage power mode "Standby" and five HDDs are set to the second stage power mode "LRPM" and these fifteen HDDs 191 are made to return to the normal mode at the same time, the return power will be "300 W+75 W=375 W" which exceeds the available return power "350 W."

In this case, the ten HDDs which are set to "Standby" are made to return to the normal mode at the first time, and then the five HDDs which are set to "LRPM" are made to return to the normal mode at the second time according to this embodiment.

If only the ten HDDs which are set to "Standby" are made to return to the normal mode at the first time, the return power required for these ten HDDs is "300 W." At this point in time, power consumption by the five HDDs which are set to "LRPM" becomes "22.5 W." Therefore, the total return power required for the first return is "322.5 W" which is less than the available return power "350 W."

In other words, if the ten HDDs which are set to "Standby" are made to return to the normal mode and the five HDDs which are set to "LRPM" are left as they are at the first time and then the five HDDs which are set to "LRPM" are made to return to the normal mode at the second time, since the five HDDs which are set to "LRPM" are not made to return at the first time, the power consumption "22.5 W" is added as the return power.

In this case, the recovery time (first time) from the first stage power mode (Standby) is 15 seconds and the recovery time (second time) from the second stage power mode (LRPM) is 4 seconds. As a result, the HDDs can return to the state capable of responding to the host in a total of 19 seconds.

If the host response time is set as a high priority and fifteen HDDs 191 are to be shifted to the power-saving mode when the available return power for chassis B is "350 W," if eight HDDs are set to the first stage power mode "Standby," the return power is "240 W." If seven HDDs are set to the second stage power mode "LRPM," the return power is "105 W." As a result, the total return power is "345 W." In this case, in terms of the return power, the total return power is "345 W" and is less than the available return power "350 W"; therefore, it is possible to make all the fifteen HDDs 191 return to the normal mode at the same time.

Regarding the recovery time, the recovery time from the first stage power mode (Standby) is 15 seconds and the recovery time from the second stage power mode (LRPM) is 4 seconds (see FIG. 7); therefore, even if all the fifteen HDDs 191 are made to return to the normal mode, it is possible to return to the state capable of responding to the host in 15 seconds, which is the recovery time from the first stage power mode (Standby).

Figure 5:
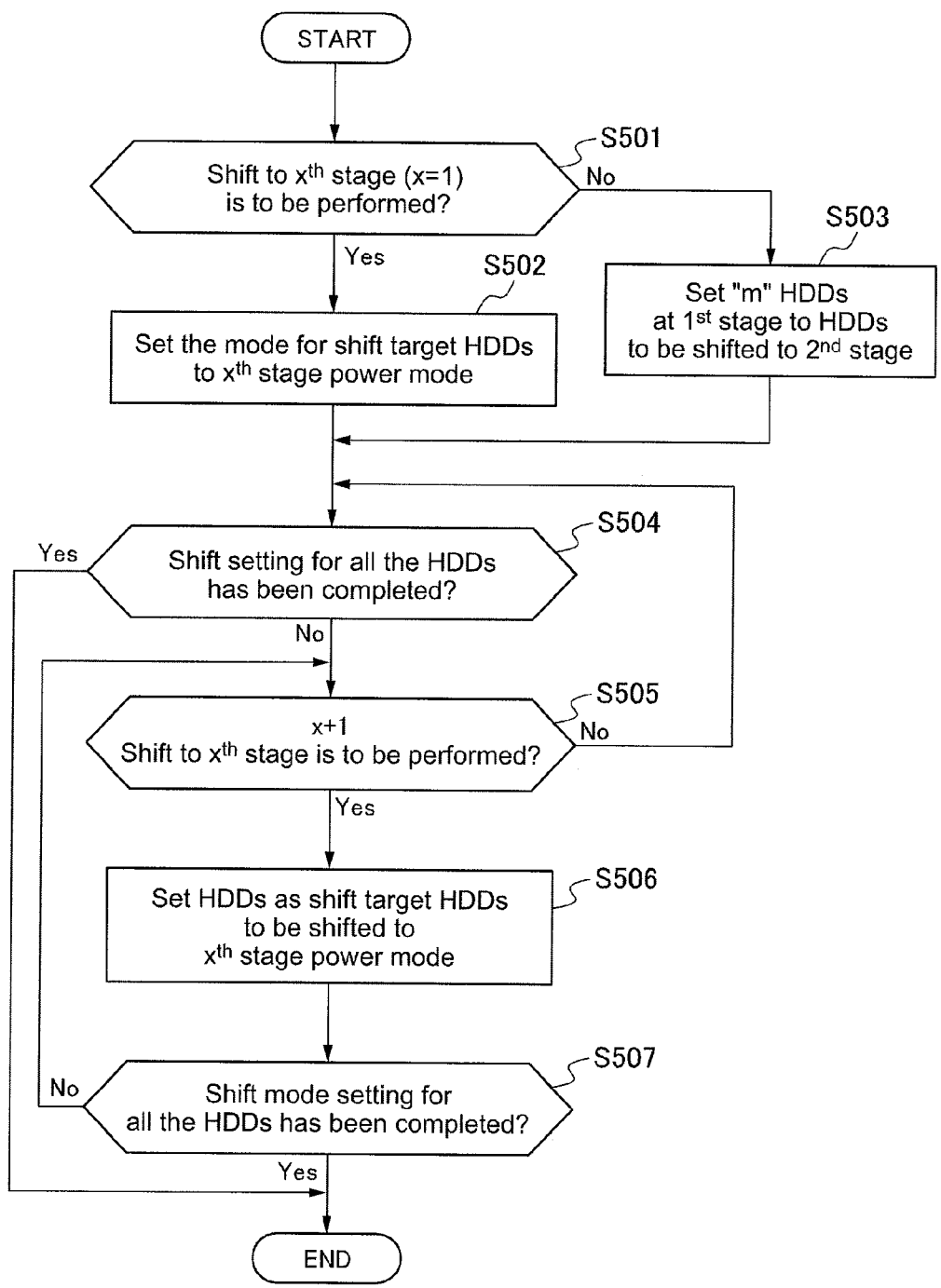
FIG. 5 is a flowchart illustrating processing for determining a power mode to which the relevant HDDs should be shifted according to the first embodiment of the invention.

FIG. 5 is a flowchart illustrating processing for deciding the shift target power-saving modes and the number of HDDs 191 which should be shifted to each power-saving mode, to determine which HDD 191 should be shifted to which power-saving mode with regard to the shift target HDDs 191 to be shifted to the power-saving mode.

This processing is the processing executed in step S206 in FIG. 2, in which the CPU 160 executes the power-saving control module 134.

In step S501, whether a shift to the first stage power mode is selected or not is judged as a mode selection when shifting to the power-saving mode. This judgment is made based on the calculation of the recovery time to the normal mode in step S204 and the result of calculation of the number of HDDs capable of power mode shifting in step S205.

If it is determined as a result of judgment that the shift to the first stage power mode is selected, the power mode for the shift target HDDs 191 to be shifted to the first stage power mode is set in step S502.

In this embodiment, for example, the calculation is conducted in step S204 by setting ten HDDs to the first stage power mode "Standby" and five HDDs to the second stage power mode "LRPM." Therefore, in step S502, the ten shift target HDDs 191 are set to shift to the first stage power mode "Standby." The processing then proceeds to step S504.

On the other hand, if it is determined in step S501 that no setting is made to shift the HDDs 191 to the first stage power mode, "m" HDDs 191 which are the result of calculation to find the number of HDDs to be shifted to the first stage are set to be shifted to the second stage power mode in step S503.

If the calculation is performed in step S204 by setting the shift target power modes to be shifted to the power-saving mode in relation to the host timeout period to "the second stage×2 steps (number of times)+the third stage×1 step (number of times)" and if the calculation is performed in step S205 by setting ten HDDs to the first stage power mode and five HDDs to the second stage power mode due to the limitation on the supplied power for the storage system 100 in this embodiment, since the shift to the first stage power mode is not set in step S204, no instruction for shift is given.

As a result, all the ten HDDs 191 which are scheduled to be shifted to the first stage power mode in step S205 are now set as the shift target HDDs to be shifted to the second stage in step S503. The processing then proceeds to step S504.

Next, whether or not the instruction to all the HDDs 191 to shift to the power-saving mode has been completed is judged in step S504.

If it is determined as a result of the judgment in step S504 that the instruction to all the HDDs 191 to shift to the power-saving mode has been completed, the HDD power mode shift processing is terminated immediately.

On the other hand, if it is determined as a result of the judgment in step S504 that the instruction to all the HDDs 191 to shift to the power-saving mode has not been completed, the processing proceeds to step S505.

In step S505, whether any HDD 191 to be shifted to the $x^{th}$ stage exists or not is judged by adding "1" to the stage number "x" which is the object of judgment.

If the instruction to set the ten target HDDs 191 to be shifted to the first stage to the power mode "Standby" has been completed in step S502 in this embodiment, "1" is added to "x" and "1+1=2" is set in step S505 in order to determine the next stage of the first stage for which the shift instruction was given last time, thereby determining the number of HDDs for which the instruction to shift to the second stage power mode should be given.

Since in this case the calculation was already done in steps S204 and S205 by setting the five HDDs to be shifted to the second stage power mode "LRPM," it is determined in step S505 that the shift to the second stage is to be performed.

If it is determined in step S505 that the shift to the $x^{th}$ stage is not to be performed, the processing returns to step S504.

On the other hand, if it is determined in step S505 that the shift to the $x^{th}$ stage is to be performed, the processing proceeds to step S506.

In step S506, the HDDs 191 are set as targets to be shifted to the $x^{th}$ stage power mode. Since the number of HDDs to be shifted to the second stage is found to be five in step S505, the power mode is set so that the five target HDDs 191 are to be shifted to the second stage power mode.

Next in step S507, whether or not the shift mode setting for all the shift target HDDs 191 to be shifted to the power-saving mode has been completed is judged.

If it is determined in step S507 that the shift mode setting for all the HDDs 191 has been completed, the processing is terminated immediately.

On the other hand, if it is determined in step S507 that the shift mode setting for all the HDDs 191 has not been completed, the processing returns to step S505 and the processing for judging whether the shift to the next stage is to be performed or not is executed.

In this embodiment, there are, for example, fifteen shift target HDDs 191 to be shifted to the power-saving mode, and the number of HDDs to be shifted to the first stage power mode is set to "ten" in step S502 and the number of HDDs to be shifted to the second stage power mode is set to "five" in step S506. Therefore, the shift mode setting has been completed for all the fifteen shift target HDDs 191. As a result, it is determined that the shift mode setting for all the HDDs 191 has been completed, thereby terminating this processing.

Figure 6:
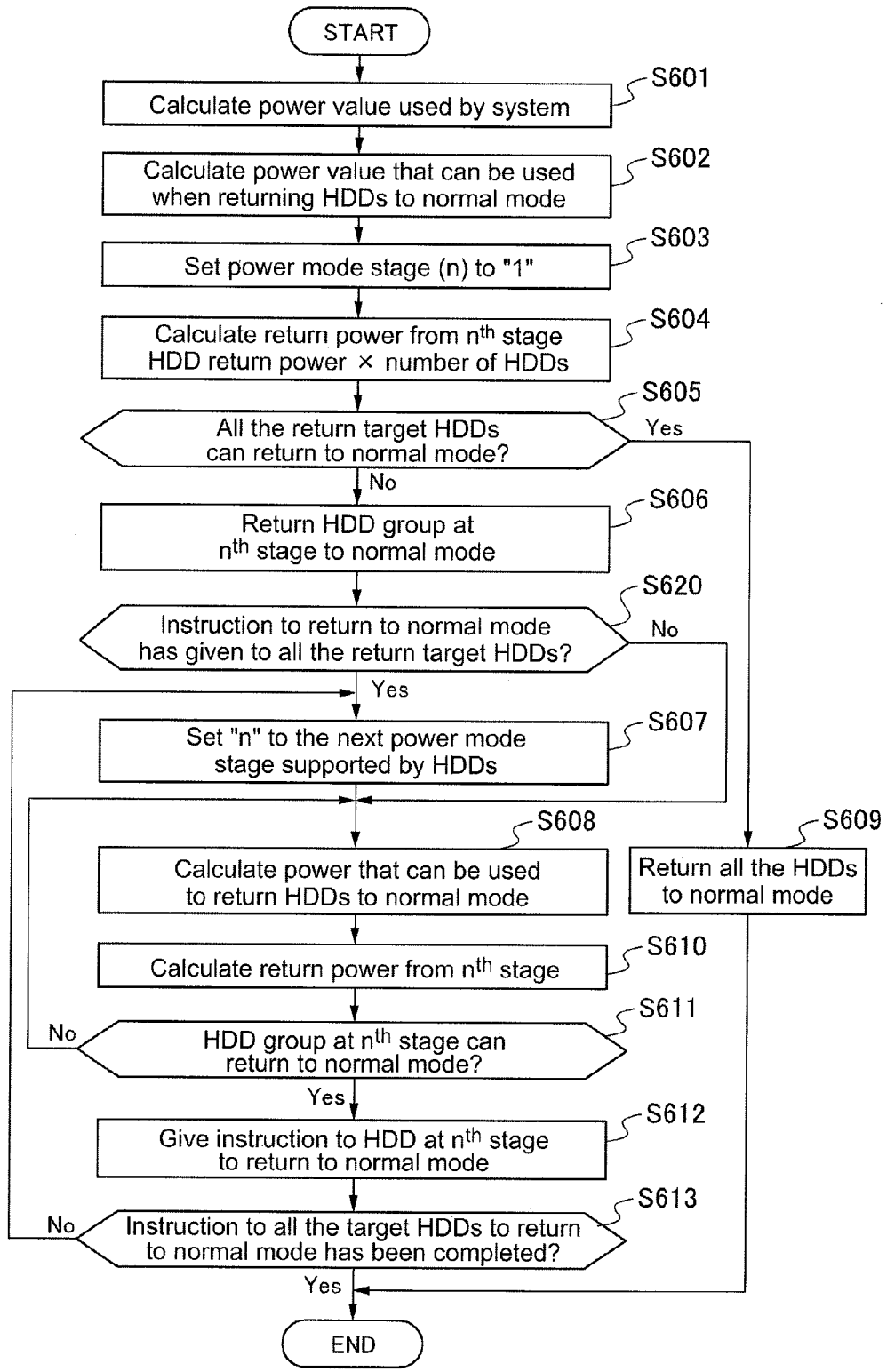
FIG. 6 is a flowchart illustrating processing for returning from a power-saving mode to a normal mode according to the first embodiment of the invention.

FIG. 6 is a flowchart illustrating processing executed by the power-saving control module 134 when making an HDD 191 group return from the power-saving mode to the normal mode so that host response time will be reduced according to the supplied power for the storage system 100.

In step S601, the power-saving control module 134 calculates the value of power used by the storage system 100 when returning to the normal mode. Regarding the amount of power used by the storage system 100, the relevant information is obtained from the system operation information management table 132 (see FIG. 8).

Next in step S602, the value of power that can be used when making the HDDs 191 return from the power-saving mode to the normal mode is calculated. In this case, the available return power 814 (100 W for chassis A and 350 W for chassis B) in the system operation information management table 132 may be used as the value of power that can be used, or the power consumption 812 by the storage system 100 may be obtained via a means for obtaining power information.

In step S603, the value of the power mode stage is set to "n=1" in order to shift to the control processing for making the HDDs 191 return from the power-saving mode to the normal mode.

In step S604, the "return power for HDD 191×the number of HDDs" is used to calculate the return power required to return from the $n^{th}$ stage power mode. If ten HDDs 191 are made to return from the first stage power mode (Standby) to the normal mode in this embodiment, the return power required from returning from "Standby" is "30 W" with reference to the HDD specification management table 131 (FIG. 7), so that the "return power from Standby 30 W×10 HDDs" results in the return power "300 W."

In step S605, whether all the return target HDDs 191 can return to the normal mode or not is judged by comparing the calculation result of the return power in step S604 with the power value that can be used for returning the HDDs 191 in step S602.

If the calculation result of the return power in step S604 is smaller than the power value that can be used for returning the HDDs 191 in step S602 and it is thereby determined in the step S605 that all the return target HDDs 191 can return to the normal mode, and the processing proceeds to step S609.

In step S609, all the return target HDDs 191 to return to the normal mode are made to return to the normal mode. The processing for returning to the normal mode is terminated by making all the return target HDDs 191 return to the normal mode.

On the other hand, if the calculation result of the return power in step S604 is larger than the power value that can be used for returning the HDDs 191 in step S602 and it is thereby determined in the step S605 that all the return target HDDs 191 cannot return to the normal mode, and the processing proceeds to step S606.

If ten HDDs out of all the return target HDDs 191 to return to the normal mode are to return from the first stage power mode (Standby) to the normal mode and ten HDDs are to return from the second stage power mode (LRPM) to the normal mode, the return power from "Standby" is "30 W×10 HDDs=300 W" and the return power from "LRPM" is "15 W×10 HDDs=150 W" with reference to the HDD specification management table 131 (FIG. 7), so that the total return power is "450 W" which is larger than the available return power.

If the total return power becomes larger than the available return power, the HDDs 191 as many as can be made to return to the normal mode from among all the return target HDDs 191 belonging to the first stage power mode are made to return to the normal mode in step S606. For example, the ten HDDs 191 belonging to the first stage power mode are made to return to the normal mode. Next, in step S620, whether or not an instruction has been given to all the return target HDDs to return from the $n^{th}$ stage is judged. If it is determined that the instruction has not been given to all the return target HDDs to return from the $n^{th}$ stage, the processing proceeds to step S608. On the other hand, if the instruction has been given to all the return target HDDs 191 to return from the $n^{th}$ stage, the processing proceeds to step S607.

Next, "n" is set to the next power mode stage supported by the HDDs 191 in step S607. Since the power mode stage "n" is, for example, "1" in step S603 in this embodiment, it is set to the second stage power mode in step S607.

In step S608, the amount of power that can be used to make the HDDs 191 belonging to the $n^{th}$ stage, for example, the second stage power mode, return to the normal mode is calculated. The power value is obtained in step S608 by subtracting the power consumption by the HDDs 191 which started returning in S606 from the power that can be used to make the previous HDDs 191 (HDDs belonging to the first stage power mode) return to the normal mode.

In step S610, the return power used to make the HDDs 191 belonging to the $n^{th}$ stage, for example, the second stage power mode, return to the normal mode is calculated. The return power is calculated by obtaining information about the power mode return power 706 from the specifications of the shift target HDDs 191 to be shifted to the normal mode in the HDD specification management table 131 (see FIG. 7). The value of the return power generally changes with time depending on the situation of the return operation.

In this embodiment, the HDDs 191 are controlled, for example, to return from the first stage power mode to the normal mode in step S606; and referring to the HDD specification management table 131 (FIG. 7), the next stage power mode is the second stage "LRPM" which is the next stage of the first stage power mode "Standby." Therefore, referring to the HDD specification management table 131 (FIG. 7), it is possible to obtain information indicating that the return power required to make the HDDs 191 belonging to the second stage "LRPM" return to the normal mode is "15 W." If there are ten HDDs 191 belonging to the second stage "LRPM" which should return to the normal mode, the return power would be "15 W×10 HDDs=150 W."

In step S611, whether or not the HDDs 191 can return from the $n^{th}$ stage power mode, for example, the second stage power mode, to the normal mode is judged. If the return power from the second stage power mode as calculated in step S610 is equal to or less than the amount of power that can be used as calculated in step S608, it is determined that the HDDs 191 can return to the normal mode.

If it is determined in step S611 that the HDDs 191 can return from the second stage power mode, an instruction is given to the HDDs 191 in the second stage power mode to return to the normal mode in step S612.

Since the calculation of the return power and the judgment on the possibility to return to the normal mode have been performed in the processing from step S608 to step S611 with regard to, for example, the second stage power mode in this embodiment, the instruction is given to the HDDs 191 to make them return from the second stage power mode to the normal mode. Hereinafter, the judgment on the supported power mode is repeated sequentially by increasing the number corresponding to "n" for the $n^{th}$ stage power mode from "2" to "3," "4," and so on within the range of power mode stages supported by the relevant HDDs 191.

If it is determined in step S611 that the HDDs 191 in the second stage power mode cannot return to the normal mode, the processing proceeds to step S608 again, power information that can be used for returning is obtained regularly, and whether it is possible to return from the second stage power mode or not is judged in the same manner. Finally, after receiving a completion notice of the previous stage (Standby) return processing for the HDDs 191, the instruction to return from the $n^{th}$ stage is given. As a specific example, after the completion of the previous stage (Standby) return processing, the power used for that processing is excluded from the return power; therefore, the next processing can be executed more quickly by waiting for the completion notice of the previous stage (Standby) return processing on the HDDs 191 and then proceeding to the next processing.

Since the judgment on, for example, the second stage power mode is performed in step S611 in this embodiment, the program waits for the completion of the processing for making the HDDs 191 return from the previous stage, the first stage power mode, to the normal mode.

In step S613, whether the instruction to all the return target HDDs 191 to make them return to the normal mode has been completed or not is judged.

If it is determined as a result of the judgment that the instruction to all the return target HDDs 191 to make them return to the normal mode has been completed, the processing is terminated.

On the other hand, if the instruction to all the return target HDDs 191 to make them return to the normal mode has not been completed, the processing returns to step S607 in order to continue the processing for giving the return instruction to the HDDs 191 which have not completed the return instruction yet; and the processing for the subsequent stages after the stage which was the target in step S612 and its preceding steps continues.

According to this embodiment, it is possible to reduce the host response time according to the supplied power for the storage system 100 when making the HDD 191 group return from the power-saving mode to the normal mode.

FIG. 7 is a configuration diagram of the HDD specification management table 131.

The HDD specification management table 131 is a table for managing information about specifications of HDDs mounted in the storage system 100. As a specific example, the HDD specification management table 131 has, for example, an "HDD type name" recording field 701, an "HDD vendor" recording field 702, a "power mode" recording field 703, a "power mode NO." recording field 704, a "power consumption" recording field 705, a "return power" recording field 706, and a "recovery time" recording field 707.

For example, the HDD type name 701 stores the type number that can identify the type of HDD 191. The specifications of the HDDs 191 mounted in the storage system 100 can be identified by managing the HDDs 191 by the HDD type name 701. The HDD vendor 702 stores vendor information about a vendor who manufactures the relevant HDD 191. Generally, the type of HDD can be uniquely identified with the HDD type name and the HDD vendor information.

The power mode 703 stores the power mode(s) supported by the relevant HDD 191. The HDD 191 generally has several modes for controlling disk heads and controlling the number of disk revolutions. The power-saving modes for the HDDs 191 can be realized by using these power modes of different types.

According to this embodiment, the HDD 191 of, for example, the HDD type name "Type 1" supports: "R/W" which is a mode where I/O is processed; "Idle" which is a mode where the disk is spinning as usual, but is not processing I/O; "Unload" which is a mode where the disk is spinning as usual, but a disk head is returned from a write position to its original position; "LRPM" which is in a state incapable of processing I/O by setting the number of disk revolutions at a low rate, thereby reducing the power consumption; "Standby" and "Sleep" for stopping the revolutions of the disk; and "Power Off" which is a mode for terminating power supply to the disk.

Each of these power modes has characteristics; and the power consumption by the HDD 191 when operating in the respective modes, whether I/O processing is possible or not when operating in the respective modes, the recovery time until the I/O processing becomes possible, and the return power required to increase the number of disk revolutions when returning to the normal mode until the I/O processing can be performed are different for each power mode.

Generally, in a power mode with small power consumption, the return power and recovery time required to return to the power mode capable of I/O processing increase.

The power mode NO. 704 indicates the number given to each type of the power mode 703. The same number may be given to different power modes. The value for the power mode NO. 704 is set to "1" for the power mode serving as the basis for shifting to the power-saving mode(s). Subsequently, "1" is added to the power mode NO. 704 for the power mode 703 with the next largest power consumption 705 or the next longest recovery time 707 to set it as the next stage to the power mode serving as the basis with the power mode NO. 704 "1." Also, "0" is set to the power modes 703 which are not used as the power-saving mode.

In this embodiment, for example, "Standby" is set as the power mode serving as the basis for power-saving modes, and the power mode NO. of the power mode "LRPM" with the next smallest power consumption or the next longest recovery time after "Standby" is set to "2." The power mode NO. of the power modes "Sleep" and "Power Off" which are not the targets for the power-saving mode shifting is set to "0."

Incidentally, the power mode NO. does not always have to be recorded or managed. It is only necessary for the power-saving control module 134 to be capable of recognizing the relationship between the power mode, the power consumption, and the recovery time when shifting to the power-saving mode and controlling the HDDs 191 to shift to the power mode that will provide the power-saving effect without the host timeout.

The power consumption 705 stores the power consumed when the HDDs 191 mounted in the storage system 100 operate in each power mode 703 supported by the type of HDDs indicated with the HDD type name 701.

For example, it is shown that the power consumption by the HDD 191 of the HDD type name "Type 1" 701 operating in the power mode "Standby" 703 is "2 W" in this embodiment.

The return power 706 stores the power consumption required when the HDD 191 returns from each power mode 703 to the state capable of I/O. According to this embodiment, for example, "15 W" of power consumption is required in order for the HDD of the HDD type name "Type 1" to return from the power mode "LRPM" 703 to the mode capable of I/O. The return power 706 required when returning from the power mode "I/O" 703, which is the state already capable of I/O, is "0 W."

The recovery time 707 stores the time required to return from each power mode 703 to the power mode 703 in the state capable of I/O. According to this embodiment, for example, it takes "15 seconds" for the HDD 191 of the HDD type name "Type 1" to return from the power mode "Standby" 703 to the state capable of I/O. For example, the recovery time from the power mode "Idle" 703 in the state already capable of I/O is "0 seconds."

In order to register information in the HDD specification management table 131, the information may be registered in advance at the time of shipment of the storage system 100, or some means like the management terminal 194 may be used to register the information via registration means such as GUI. Alternatively, the storage system 100 may read the information from the HDDs 191 and register it in the HDD specification management table 131.

Figure 8:
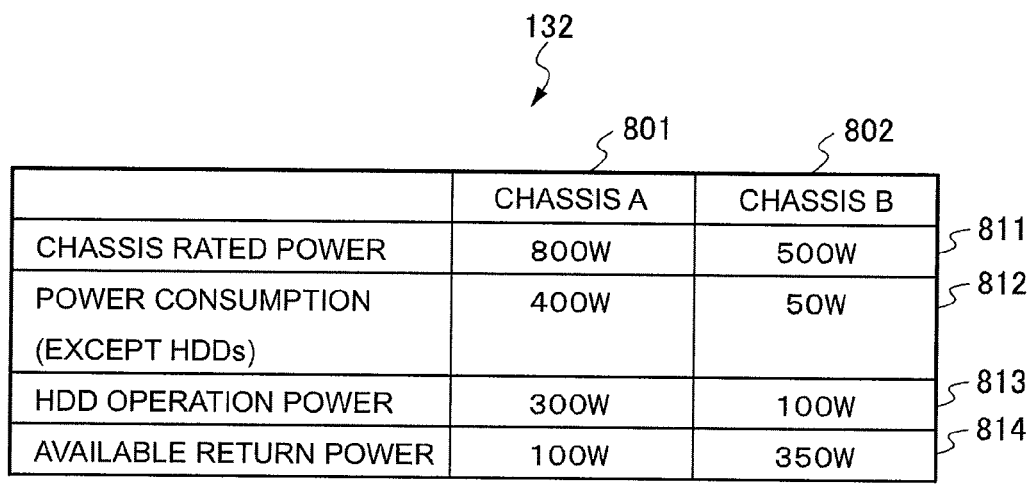
FIG. 8 is a configuration diagram of a system operation information management table for managing the power status of storage units according to the invention.

FIG. 8 is a configuration diagram of the system operation information management table 132.

The system operation information management table 132 stores various kinds of power information on a power management unit basis. As a specific example, a "chassis A" field 801 and a "chassis B" field 802 manage items for the power management unit. The power management unit may be the entire storage system 100 or each chassis constituting the storage system 100. The field may be created as many as the number of the management objects.

A "chassis rated power" field 811 stores the rated power specified for each power management unit. A "power consumption" field 812 stores the value of power consumed by the relevant component which is the power management unit. An "HDD operation power" field 813 stores a total value of power consumed by the relevant HDD 191. An "available return power" field 814 stores power consumption that can be used to make the HDD 191 return from the power-saving mode to the normal mode.

FIG. 8 shows that, for example, regarding chassis B constituting the storage system 100 according to this embodiment, the rated power 811 is "500 W," the power consumption 812 is "50 W," the HDD operation power 813 is "100 W," and the available return power 814 is "350 W." Regarding items for which certain values should be set, information to be stored in the system operation information management table 132 may be registered in advance or registered using a registration means such as the GUI for the management terminal. The values such as the power consumption value which may vary depending on the operational status of the storage system 100 may be updated by collecting information depending on changes or at regular time intervals or in the event of, for example, shifting to the power-saving mode.

Figure 9:
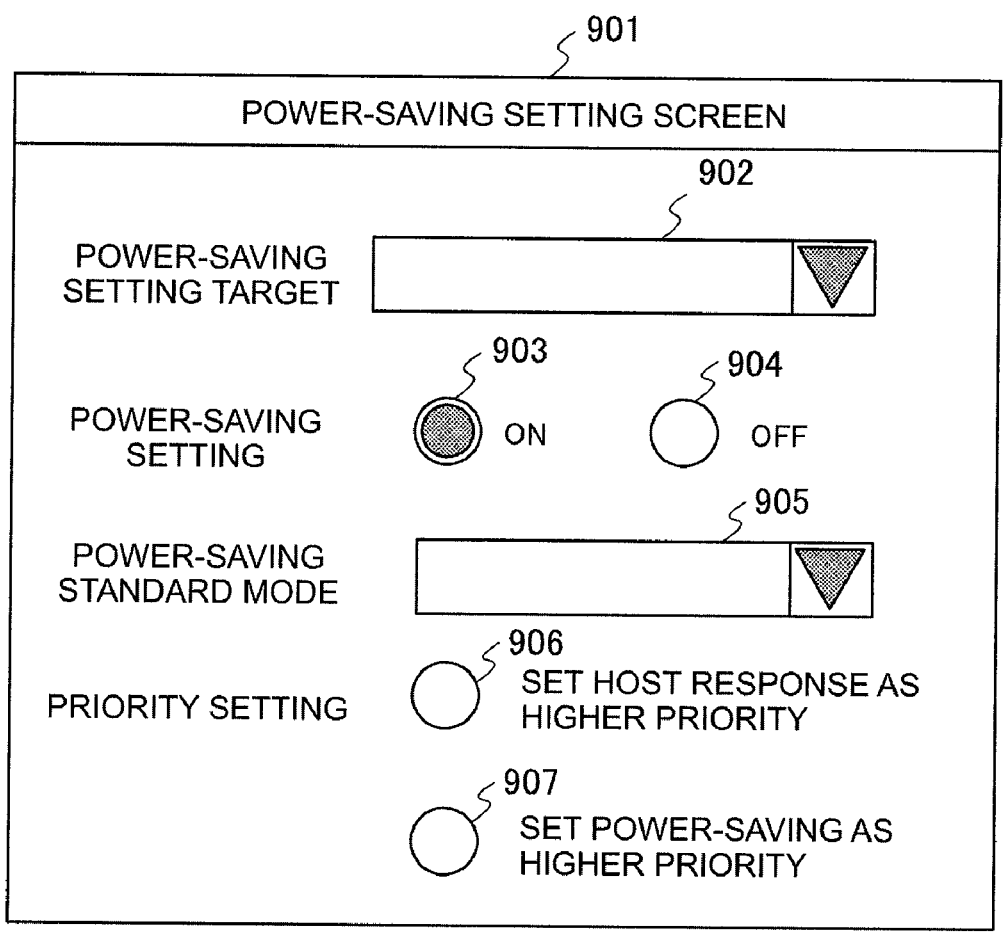
FIG. 9 is a diagram showing an example of a power-saving setting screen according to the invention.

FIG. 9 shows an example of a power-saving setting screen 901 for making settings relating to the power-saving setting for the storage system 100.

The power-saving setting screen 901 is a GUI displayed on the management terminal 194. The power-saving setting screen 901 is provided with a "power-saving setting target" designating field 902, selection buttons 903 and 904 for selecting either in effect or not in effect for the power-saving setting, a "power-saving standard mode" selecting field 905, and selection buttons 906 and 907 for selecting the priority setting.

The user sets the power-saving setting screen 901 using, for example, the GUI on the management terminal 194. The "power-saving setting target" designating field 902 is set by means of a setting operation by selecting a control unit for which the instruction to shift to the power-saving mode is given. For example, the storage system 100, a RAID group, an LU, or the like is selected as a power control unit. Conditions of the shift to the power-saving mode are set separately. When making the power-saving setting, either the selection button "ON" 903 or the selection button "OFF" 904 for the power-saving mode for the entire storage system 100 is selected. The shift to the power-saving mode is applied only when the selection button "ON" 903 is selected. The "power-saving standard mode" field 905 is set by means of a setting operation by selecting a power mode that serves as the basis for making the HDDs 191 included in the power-saving setting targets shift from the power mode supported by the HDDs 191 to the power-saving mode.

The power mode set in the "power-saving standard mode" field 905 is set to the standard value "1" in the "power mode NO." field 704 in the HDD specification management table 131 (FIG. 7) for the corresponding power mode in the power mode 703. If the host response is set as a higher priority with regard to the priority setting when shifting to the power-saving mode, the selection button 906 is selected; and if the power-saving effect is set as a higher priority, the selection button 907 is selected. When the host response is set as a higher priority, the controller 110 performs shifting to the power-saving mode by a control method that enables returning to the normal mode in as short a time as possible within the host response time; and when the power-saving is set as a higher priority, the controller 110 performs shifting to the power-saving mode by a control method that has a higher power-saving effect than the recovery time within the host response time.

Once the "OK" button is pushed by the user, the controller 110 updates the information in the specified tables and the storage areas in the storage system 100 with the information set in each input field.

Figure 10:
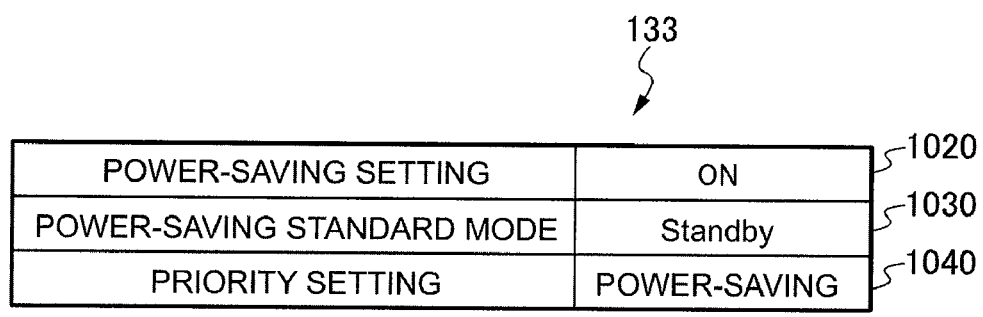
FIG. 10 is a configuration diagram of a power-saving setting management table for storing power-saving settings according to the invention.

FIG. 10 is an example of the power-saving setting management table 133.

As a specific example, the power-saving setting management table 133 stores setting items such as a power-saving setting 1020, a power-saving standard mode 1030, a priority setting 1040, and the setting content input on the power-saving setting screen 901 is saved in this table 133.

According to this embodiment, for example, "ON" is set in the power-saving setting 1020 and "Standby" is set in the power-saving standard mode 1030. Also, FIG. 10 shows that "power-saving" is set in the priority setting 1040.

FIG. 11 is a configuration diagram of the host timeout management table 137.

The host timeout management table 137 is a table for associating storage areas for the storage system 100 with the hosts using the storage areas and managing information about the timeout period for each host.

As a specific example, a "host" field 1101 is provided with a "default" record 1110 and records 1120 for registering host identification names. The default record is the first record and a host identification name record is recorded for each host which is connected to the storage system 100 and for which a host identification name is set. A "timeout" field 1102 stores information about the host timeout period for the host 1101. A "corresponding LU" field 1103 stores the LU number in the storage system 100, which is used by the host 1101 because, for example, path setting to the host 1101 is made. A "corresponding RG" field 1104 stores the number of RG to which the LU used by the host 1101 belongs.

Regarding the "host" field 1101 of the individual setting target hosts, information about the timeout 1102, the corresponding LU 1103, and the corresponding RG 1104 for each host is stored. The default setting is one setting which stores a setting value serving as the basis for the host timeout period.

As a specific example, the value of the timeout 1102 is recorded for the default setting. Information about the corresponding LU 1103 and the corresponding RG 1104 is unnecessary. If the corresponding host 1101 setting is not registered for the target RG and LU when shifting to the power-saving mode, the default setting is applied. Information recorded in the timeout period management table 137 of FIG. 11 may be set using the GUI for the management terminal 194, or the storage system 100 may automatically obtain the information, or the storage system 100 may obtain the timeout information by communicating with the host 180.

Figure 12:
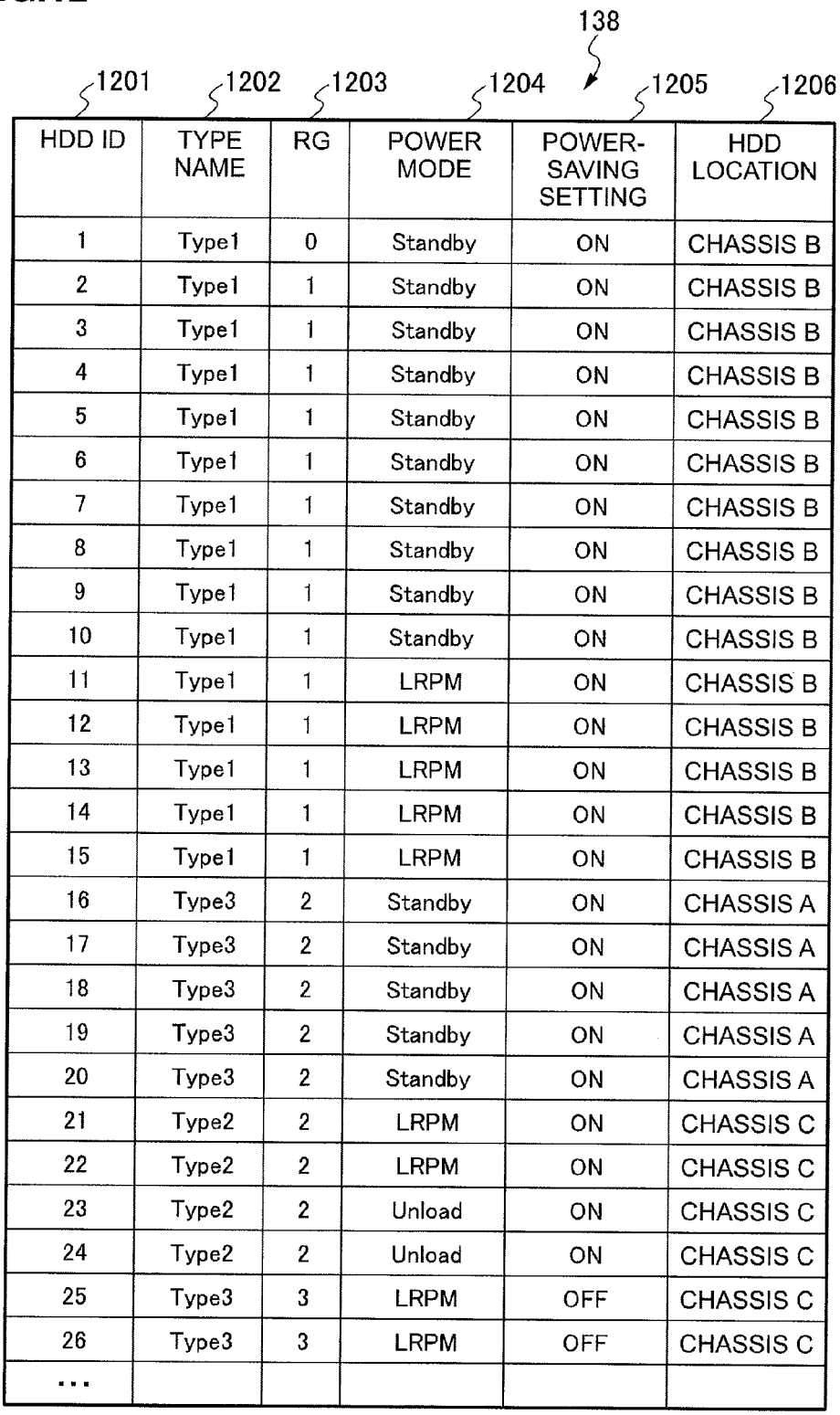
FIG. 12 is a configuration diagram of an HDD operation information management table for managing the HDD configuration and settings according to the first embodiment of the invention.

FIG. 12 is a configuration diagram of the HDD operation information management table 138.

The HDD operation information management table 138 is a table for managing the power-saving setting status and the operational status of each HDD 191. As a specific example, the HDD operation information management table 138 includes: an "HDD ID" field 1201 for managing the ID for uniquely identifying the relevant HDD 191; a "type name" field 1202 for registering the type name of the relevant HDD 191; an "RG" field 1203 for registering the RG number to which the relevant HDD 191 belongs; a "power mode" field 1204 for recording information indicating in which power mode the relevant HDD 191 is currently operating; a "power-saving setting" field 1205 for recording whether the power-saving setting is on or not for the relevant HDD 191; and an "HDD location" field 1206 for recording at which position in the storage system 100 the relevant HDD 191 is located.

In order to record the type name 1202, the user may input correct information using the GUI for the management terminal 194 or the storage system 100 may obtain and identify the individual information about the HDDs 191; however, any one of the type names registered in the HDD type name 701 in the HDD specification management table 131 (FIG. 7) is recorded.

The HDD location information does not always have to be managed by the HDD operation information management table 138 as long as information capable of uniquely identifying the mounting position of the relevant HDDs 191 can be obtained from the existing management information that the storage system 100 has.

The first embodiment has been explained above.

According to the first embodiment, the host response time can be reduced and the high power-saving effect can be realized by combining one or more power modes in the power management unit such as an RG based on the specifications and operational status of HDDs under the return conditions of the host timeout period and the supplied power for the storage system 100.

Second Embodiment

The second embodiment of the present invention will be explained below. In the following explanation, the difference between the first embodiment and the second embodiment will be mainly explained, and an explanation of anything in common with the first embodiment has been summarized or omitted.

When constructing a power management unit such as an RG according to the second embodiment, the arrangement that will realize both reduction of the host response time and the power-saving effect is decided in advance in consideration of the supplied power for the storage system 100.

The second embodiment of the invention will be explained below in detail.

Figure 13:
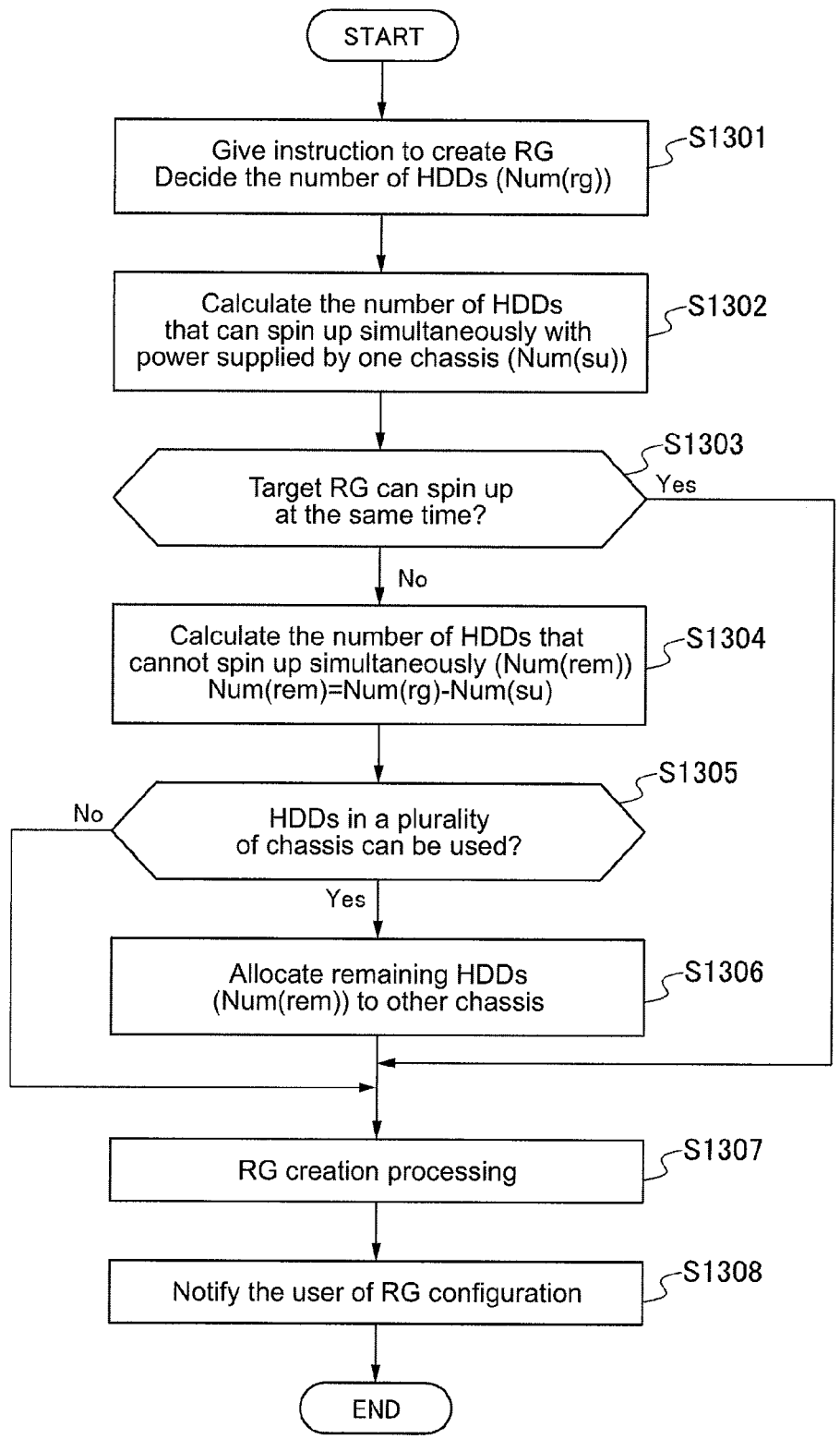
FIG. 13 is a flowchart illustrating RAID group creation processing according to the second embodiment of the invention.

FIG. 13 is a flowchart illustrating RG creation processing according to the second embodiment of the invention. In this processing, the CPU 160 executes the power-saving control module 134 to decide the arrangement of HDDs 191 according to the power-saving mode control when creating an RG.

In step S1301, the storage system 100 receives an RG creation instruction. The user may give the instruction using the GUI for the management terminal or the storage system 100 may autonomously create an RG by automatizing the capacity management. When creating an RG, the number of HDDs 191 constituting the RG (represented as Num(rg)) is decided.

When an RG of the RAID 6 type is to be created, if the number of data disks is "thirteen," there will be "two" parity disks and a total of "fifteen" HDDs 191 will constitute an RG. Also, when creating an RG, the disk types such as FC, SAS, or SATA may be designated as the HDD 191 type.

In step S1302, the number of HDDs that can spin up simultaneously with the supplied power for one chassis (represented as Num(su)) is calculated for the HDD type selected in step S1301.

If the instruction is given to create an RG with the HDDs 191 of the SATA type according to this embodiment, and if the HDD type name "Type 1" in the HDD type name 701 in the HDD management table 138 indicates the HDDs 191 of the SATA type, it is found that "30 W" will be consumed as the return power from "Standby."

Furthermore, based on the system operation information management table 132 (FIG. 8), the rated power for chassis B 802 is "500 W" and the power consumption (other than HDDs) is "50 W." Therefore, the maximum value of the available return power 814 is "450 W." As a result, the calculation shows that a maximum of fifteen HDDs 191 of the HDD type name "Type 1" can spin up at the same time.

In step S1303, whether or not the target RG to be created can spin up at the same time is judged.

If it is determined as a result of the judgment in step S1303 that the target RG can spin up at the same time, RG creation processing is executed immediately.

On the other hand, if it is determined as a result of the judgment in step S1303 that the target RG cannot spin up at the same time, the processing proceeds to step S1304.

In step S1304, the number of HDDs that cannot spin up at the same time (represented as Num(rem)) is calculated. The value for Num(rem) is obtained by subtracting the number of HDDs that can spin up at the same time as calculated in step S1302 from the number of HDDs 191 constituting the RG.

Next in step S1305, whether or not HDDs in a plurality of chassis can be used to create an RG is judged. When the storage system 100 is constituted from a plurality of chassis and unused HDDs 191 exist and are distributed in the plurality of different chassis, whether or not such HDDs 191 can be used to create a new RG is judged.

If it is determined as a result of the judgment in step S1305 that the HDDs 191 in the plurality of chassis cannot be used, an RG configuration using the HDDs 191 in one chassis is employed and the processing proceeds to step S1307.

If it is determined as a result of the judgment in step S1305 that the HDDs 191 in the plurality of chassis can be used, the processing proceeds to step S1306.

In step S1306, an RG configuration in which the HDDs 191 which cannot spin up at the same time as calculated in step S1304 are allocated to other chassis is employed. If the RG to be created is composed of fifteen HDDs 191, and if only twelve HDDs in chassis A can spin up at the same time and there are three HDDs 191 in chassis B that can be allocated to a new RG to be created, an RG configuration in which HDDs 191 are arranged in different chassis A and B is employed. In this case, the same processing as that executed for chassis A is executed for chassis B for judging whether HDDs can spin up at the same time or not, so that the recovery time is calculated for chassis B and the number of HDDs 191 in chassis B that can spin up at the same time is decided.

In step S1307, the RG creation processing is executed in accordance with the RG configuration decided in the preceding steps S1301 to S1306.

Finally in step S1308, the created RG configuration is reported to the user. The report to the user may be made using some display means such as the GUI for the management terminal 194. If the storage system 100 autonomously creates an RG irrespective of the user's instruction, the RG configuration may not be expressly reported to the user.

The second embodiment has been explained above.

According to the second embodiment, it is possible to enhance the power-saving effect and reduce the host response time by dividing the HDDs 191 constituting a new RG to be created and locating them in a plurality of chassis A and B.

For example, when an RG composed of fifteen HDDs 191 is to be created in the configuration where the fifteen HDDs 191 cannot spin up at the same time in one chassis, and if the HDDs 191 are to return from the power-saving mode "Standby" to the normal mode, they can return to the normal mode by making all the fifteen HDDs 191 spin up at the same time by dividing and distributing the fifteen HDDs 191 constituting the RG in two chassis A and B.

Incidentally, the power management unit does not have to be limited to a chassis as long as each power management unit has a different limitation on the supplied power.

Third Embodiment

The third embodiment of the present invention will be explained below.

In the third embodiment, a shift to the power-saving mode is controlled in a case where there are a plurality of types of HDDs 191 constituting an RG and these HDDs 191 are located in a plurality of chassis.

As a specific example, according to the third embodiment, the shift to the power-saving mode is controlled in consideration of the facts that "Unload," "LRPM," "Standby," and "Sleep" exist as power-saving modes of the HDDs 191 and "Type 1" can have these power-saving modes as its options, and "Standby" and "Sleep" exist as power-saving modes for the HDDs 191 and "Type 2" and "Type 3" can have these power-saving modes as their options.

The third embodiment of the invention will be explained below in detail.

FIG. 14 is a configuration diagram of an HDD operation information management table 138 used in the third embodiment.

According to information recorded in the HDD operation information management table 138 shown in FIG. 14, the HDDs 191 with ID "1" to ID "20" in an "HDD ID" field 1201 belong to the same RG "1" and their power-saving setting is in effect. The type name for the HDDs 191 with the ID "1" to "10" in the HDD ID 1201 is "Type 1," the type name for the HDDs 191 with the ID "11" to "16" in the HDD ID 1201 is "Type 2," and the type name for the HDDs 191 with the ID "17" to "20" in the HDD ID 1201 is "Type 3."

The HDDs with the HDD ID "1" to "15" are located in chassis A, and the HDDs with the HDD ID "16" to "20" are located in chassis B. As indicated with the type name, each HDD 191 supports the power modes as registered in the HDD specification management table 131 (FIG. 7), and different types support different power modes.

The power modes for the RG composed of HDDs 191 of different types which support different power modes as described above are controlled.

Figure 15:
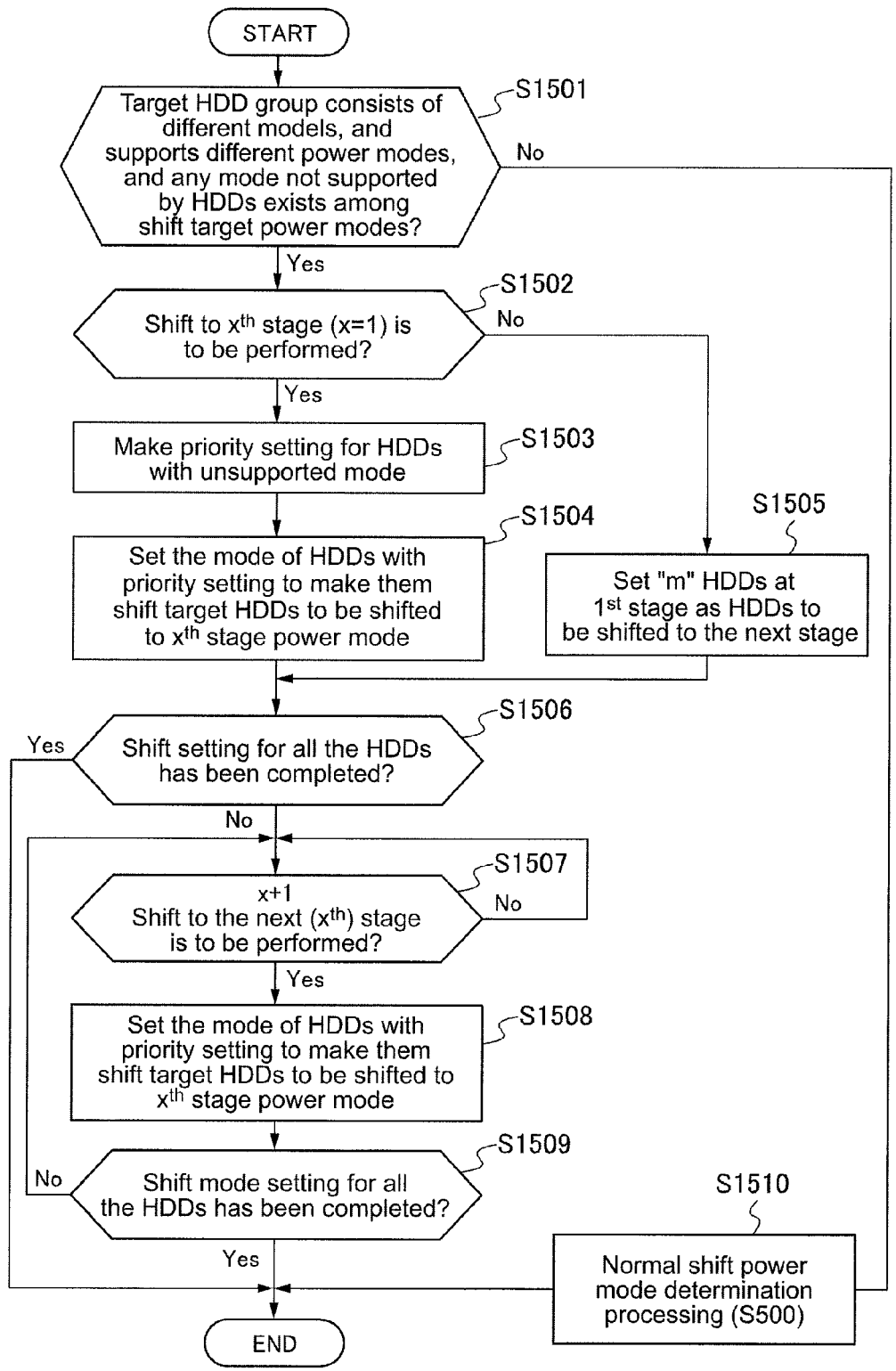
FIG. 15 is a flowchart illustrating processing for determining the power mode, to which the relevant HDDs should be shifted, when shifting the power mode to the power-saving mode according to the third embodiment of the invention.

FIG. 15 is a flowchart illustrating shift power mode determination processing for HDDs 191 when shifting to the power-saving mode according to the third embodiment.

In step S1501, whether or not a shift target HDD 191 group to be shifted to the power-saving mode consists of different models (types) and supports different power modes, and whether or not any unsupported power mode exists in the possible shift target power modes to be shifted to the power-saving mode among different HDD 191 models are judged.

According to this embodiment, for example, "RG 1" is composed of HDDs 191 of Type 1, Type 2, and Type 3 in the HDD specification management table 131 (FIG. 7). Different HDD 191 models support different power modes. While the HDDs 191 of Type 1 supports the power modes such as "Unload" and "LRPM," the HDDs 191 of Type 2 and Type 3 do not support the above-mentioned power modes.

If it is determined in step S1501 that the shift target HDD 191 group is composed of HDDs of the same model or there is no difference in the power modes supported by these HDDs, the processing proceeds to step S1510.

In step S1510, normal power mode determination processing (corresponding to the processing in S500) is executed and then terminated.

On the other hand, if it is determined in step S1501 that the shift target HDD 191 group is composed of HDDs 191 of different models and these HDDs 191 support different power modes, the processing proceeds to step S1502.

In step S1502, whether a shift to the $x^{th}$ stage is to be performed or not is judged. It is assumed that the optimum number of HDDs 191 has been calculated in the same manner as in step S205 and preceding steps in FIG. 2 to determine how many HDDs in the shift target HDD 191 group to be shifted to the power-saving mode should be shifted to which mode, based on the condition of the host timeout period and the condition of the supplied power for the storage system 100.

The "x" value of the first time is set to "1," and whether the setting for the shift to the $x^{th}$ stage is made or not is judged.

If it is determined as a result of the judgment in step S1502 that the setting for the shift to the first stage is not made, the processing proceeds to step S1505.

In step S1505, "m" HDDs 191 found as a result of calculation of the number of HDDs to be shifted to the first stage are set as the shift target HDDs 191 to be shifted to the next stage power mode. The processing then proceeds to step S1506.

On the other hand, if it is determined as a result of the judgment in step S1502 that the setting for the shift to the first stage power mode is made, the processing proceeds to step S1503.

In step S1503, a priority setting is made for the HDDs 191 with unsupported power modes among the shift target HDD 191 group to be shifted to the power-saving mode.

As a specific example, when shifting the HDDs 191 belonging to RG1 to the power-saving mode, the setting is made so that ten HDDs 191 will be shifted to the first stage power mode "Standby" and five HDDs 191 will be shifted to the second stage power mode "LRPM"; and if the shift target HDDs 191 are composed of HDDs 191 of Type 1 and Type 2 in the HDD specification management table 131, the priority rank set for the "Type 2" HDD 191 group is higher than that for the "Type 1" HDD 191 group so that the "Type 2" HDDs 191 group will be shifted to the power mode "Standby" with a higher priority.

The difference between Type 1 and Type 2 is that while the Type 1 model HDD 191 supports the power mode "LRPM," the Type 2 model HDD 191 does not support the power mode "LRPM." A method for judging the priority rank is to utilize such difference and set the first stage power mode with a high priority to the "Type 2" HDD 191 to which a shift to the second stage power mode "LRPM" cannot be set.

In other words, even if the HDDs 191 belonging to Type 1 remain without being set with a high priority, the remaining HDDs 191 can be set to "LRPM." On the other hand, if the HDDs 191 belonging to Type 2 remain without being set with a high priority, the remaining HDDs 191 cannot be set to other power-saving modes.

Also, since the number of HDDs 191 that can shift to the first stage power mode is already decided in the power-saving mode shift condition and the "Type 1" HDD 191 group is set to shift to the first stage power mode with a higher priority, it is necessary to set the "Type 2" HDD 191 group to shift to the power mode at the third or higher stage and, therefore, the power-saving effect will be reduced.

Alternatively, a combination with much smaller power consumption and return power and shorter recovery time may be set based on the HDD 191 specification information.

In step S1504, the power mode of the HDDs 191 for which the priority setting was made in step S1503 is set as the power mode for the shift target HDDs 191 to be shifted to the first stage power mode. If the number of the shift target HDDs 191 to be shifted to the first stage power mode is larger than the number of the HDD 191 model for which the priority setting is made, the power mode for the shift target HDDs 191 to be shifted to the first stage power mode is set to the HDDs 191 with the next highest priority or for which the priority setting is not made.

As a specific example, if as indicated in the specific example of step S1503 the "Type 2" HDD 191 group is set as a higher priority to be shifted to the power mode "Standby" and the priority setting is not made for the "Type 1" HDD 191 group, the power mode setting is made to the five "Type 2" HDDs 191 to be shifted to the first stage power mode "Standby."

Since the power-saving control module 134 has already set the ten HDDs 191 to be shifted to the first stage power mode "Standby" and there are ten shift target HDDs 191 of the type to be shifted to the power-saving mode among the "Type 1" HDD 191 group for which the priority setting is not made, the remaining five HDDs 191 to be shifted to the first stage power mode are selected arbitrarily from these ten HDDs 191 and the power mode is set to the selected five HDDs 191 as the shift target HDDs 191 to be shifted to the first stage power mode "Standby."

Next in step S1506, whether the power mode shift instruction to all the HDDs 191 has been completed or not is judged.

If it is determined in step S1506 that the power mode shift instruction to all the HDDs 191 has been completed, the power mode setting processing for the shift to the power-saving mode is terminated.

On the other hand, if it is determined in step S1506 that the power mode shift instruction to all the HDDs 191 has not been completed, the processing proceeds to step S1507.

In step S1507, "1" is added to the stage number "x" and whether a shift to the $x^{th}$ stage is set or not is judged in order to determine whether the power mode at the next stage of the stage for which the shift target power mode stage is already set should be set or not.

As a specific example, if the setting relating to the first stage power mode has already been set in step 1504 and preceding steps under the shift condition as indicated in the specific example of step S1503, whether the shift to the next stage, i.e., the second stage power mode, is to be performed or not is judged in this step.

If it is determined in step S1507 that the setting for the shift to the next stage power mode is made, the processing proceeds to step S1508.

On the other hand, if it is determined in step S1507 that the setting for the shift to the next stage power mode is not made, the processing proceeds to step S1507 again and whether the setting for the shift to the next stage power mode is made or not is judged and the processing continues.

In step S1508, the $x^{th}$ stage power mode which is the setting target is assigned to the HDDs with the priority setting so that these HDDs are set as the shift target HDDs 191 to be shifted to the $x^{th}$ stage power mode with a high priority in the same manner as in step S1504. If the shift target power mode is already assigned to the priority setting HDDs 191, the shift target power mode is assigned to the HDDs 191 for which the priority setting is not made so that these HDDs 191 are set to be shifted to the $x^{th}$ stage power mode.

As a specific example, since the mode setting is made to the "Type 2" HDD 191 group for which the priority setting was made as indicated in the specific example of step S1504 so that all the "Type 2" HDDs 191 are to be shifted to the first stage power mode with a higher priority, no HDD 191 with the priority setting is left and the remaining HDDs 191 to be shifted to the power-saving mode are the "Type 1" HDDs for which the priority setting is not made. Therefore, the power mode is set to the "Type 1" HDDs 191 as the shift target HDDs 191 to be shifted to the second stage power mode.

In step S1509, whether the power mode shift setting to all the HDDs 191 has been completed or not is judged.

If it is determined as a result of the judgment in step S1509 that the power mode shift setting has been completed, the HDD 191 shift setting processing is terminated.

On the other hand, if it is determined as a result of the judgment in step S1509 that the power mode shift setting has not been completed, the processing proceeds to step S1507, and whether the setting for the shift to the next stage power mode is made or not is judged and the processing continues.

The third embodiment has been explained above.

When there are different types of HDDs 191 that constitute the power control unit such as a RAID group which is the shift target to be shifted to the power-saving mode, it is possible according to the third embodiment to control each type of HDD 191 in accordance with the power-saving modes supported by each type of HDD 191.

Fourth Embodiment

The fourth embodiment of the present invention will be explained below.

The fourth embodiment is designed so that when a virtual LU that provides the user with the same usability as that of a normal LU is composed of a plurality of pages (physical storage areas) based on a plurality of HDDs 191 belonging to the storage system 100, pages storing data to which almost no access is made are identified and the return power is controlled in the state where the pages are relocated according to the identification result.

The fourth embodiment of the invention will be explained below in detail.

Figure 16A:
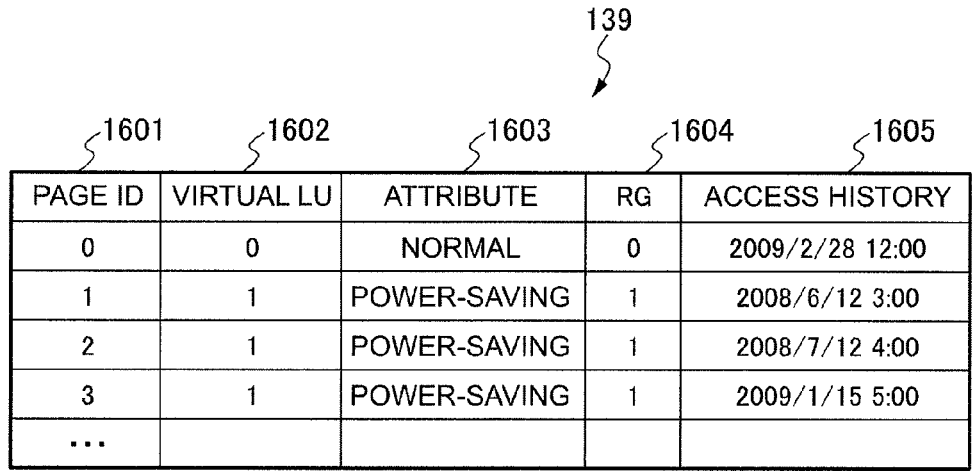
FIG. 16A is a configuration diagram of a page management table before relocation according to the fourth embodiment of the invention.
Figure 16B:
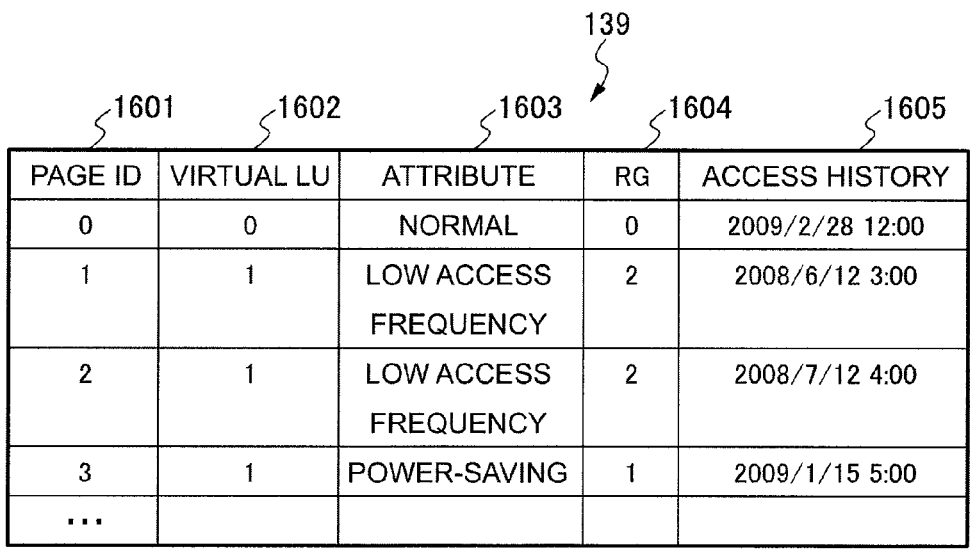
FIG. 16B is a configuration diagram of the page management table after relocation according to the fourth embodiment of the invention.

FIG. 16A and FIG. 16B are configuration diagrams of the page management table 139.

FIG. 16A shows information in the page management table 139. As a specific example, the page management table 139 before relocation records information about the following items: a "page ID" field 1601 for storing an ID capable of uniquely identifying the relevant page; a "virtual LU" field 1602 for storing the number of a virtual LU to which the page with the page ID 1601 belongs; an "attribute" field 1603 for storing "normal," "power-saving," or "low access frequency" as the attribute of the relevant page; an "RG" field 1604 for storing the number of a RAID group to which the page with the page ID 1601 belongs; and an "access history" field 1605 for recording the last access date and time as the access history of the relevant page.

FIG. 16B shows information of the page management table 139 when the pages are relocated as a result of analysis of the access history.

As a specific example, for example, the page ID "0" belongs to virtual LU0 and has high access frequency and, therefore, it is recorded as a normal page. The page ID "3" 1601 is recorded as a power-saving page because no access has been made for a certain period of time. Furthermore, pages with the page ID "1" and "2" have been changed from the power-saving pages to the low access frequency pages and their RG has been changed from "1" to "2" because they have not been accessed for a long period of time.

Figure 17A:
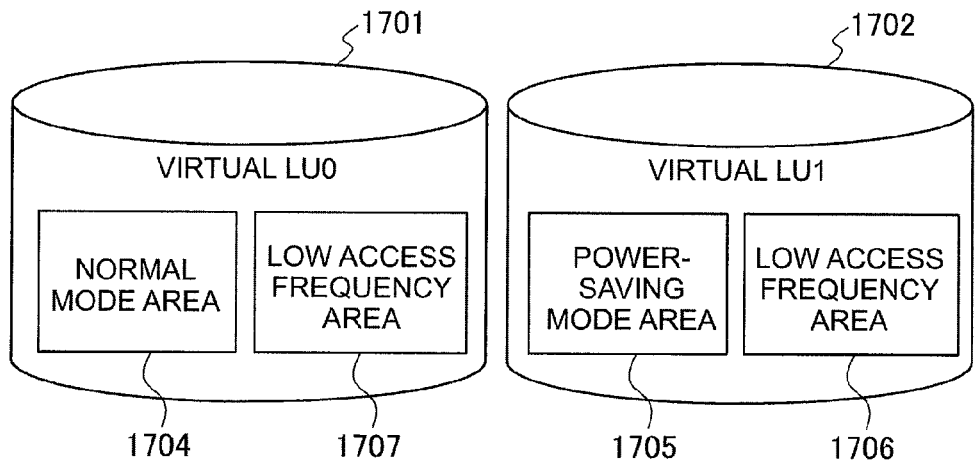
FIG. 17A is a configuration diagram of virtual LUs according to the fourth embodiment of the invention.
Figure 17B:
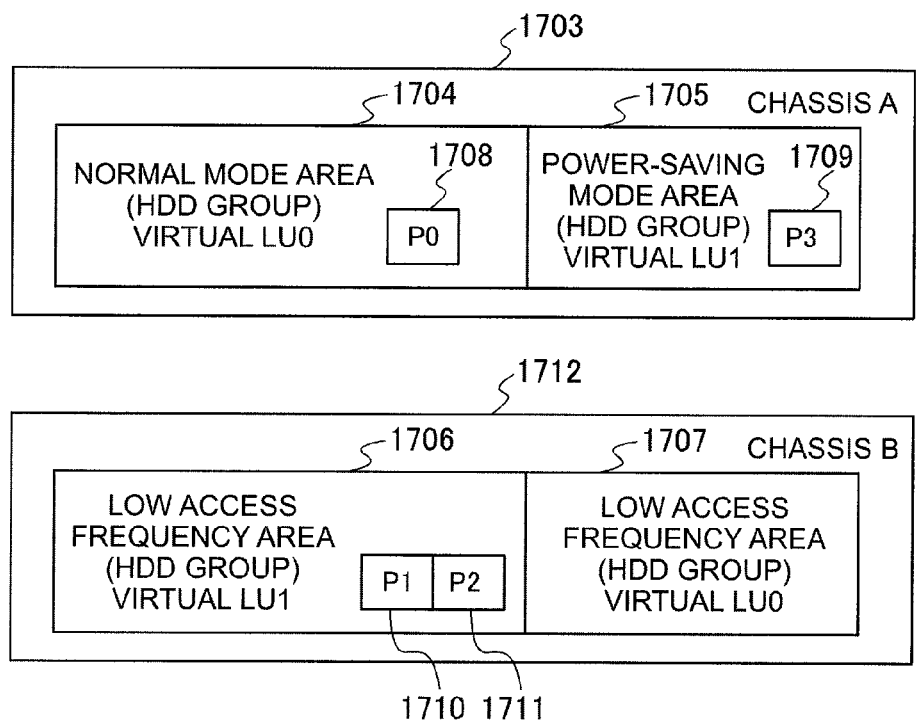
FIG. 17B is a configuration diagram of a chassis according to the fourth embodiment of the invention.

FIG. 17A is a configuration diagram of virtual LUs according to the fourth embodiment of the invention and is a conceptual configuration diagram showing association between the virtual LUs and pages in the storage system 100. FIG. 17B is a configuration diagram of chassis according to the fourth embodiment of the invention.

A virtual LU0 1701 is an LU composed of one or more areas and is constituted from a normal mode area 1704 and a low access frequency area 1707.

A virtual LU1 1702 is constituted from a power-saving mode area 1705 and a low access frequency area 1706. Page 0 (P0) 1708 belongs to the normal mode area 1704 belonging to the virtual LU0 in chassis A 1703, and page 1 (P1) 1710 and page 2 (P2) 1711 belong to the low access frequency area 1706 belonging to the virtual LU1 in chassis B 1712. Page 3 (P3) 1709 belongs to the power-saving mode area 1705 belonging to the virtual LU1 in chassis A.

It is possible to prevent the host timeout and realize the power-saving effect by combining the area in which a host I/O or the like occurs normally and which is accessed frequently, or the power-saving mode area 1705 in which the HDDs 191 spin down or up according to a host I/O, and the low access frequency areas 1706, 1707 to which almost no access is made, and locating these combined areas in chassis A and B so that the power-saving mode area is constructed in the number of HDDs 191 that can return to the normal mode using the supplied power for the storage system 100 or the electric power equal to or less than the rated power limitations for chassis A and B when returning from the power-saving mode to the normal mode.

Figure 18:
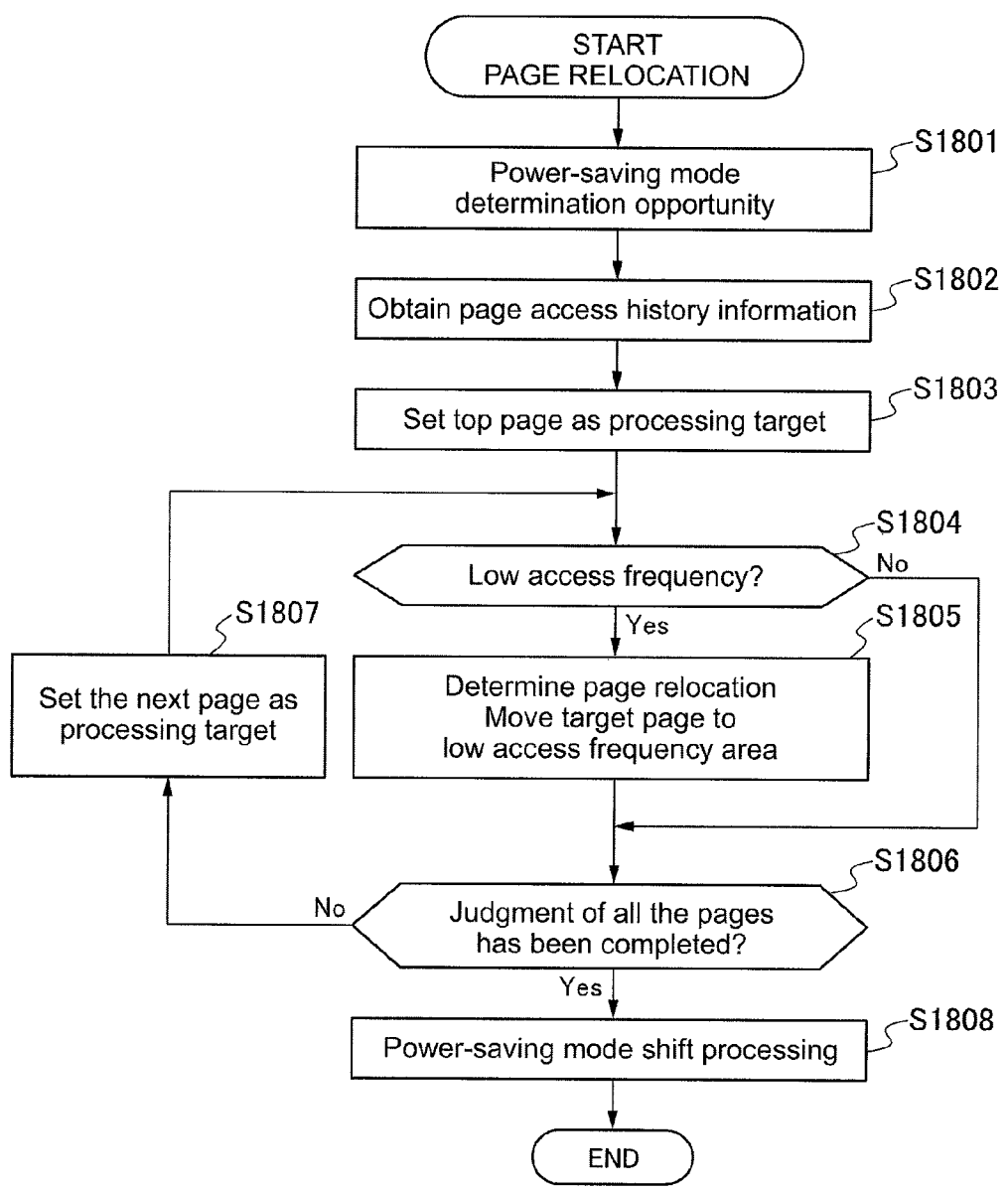
FIG. 18 is a flowchart illustrating page relocation processing according to the fourth embodiment of the invention.

FIG. 18 is a flowchart illustrating processing for detecting no access pages and relocating them to a no access area according to the fourth embodiment. In this processing, the CPU 160 executes the access history management module 136.

In step S1801, the access history management module 136 judges whether the opportunity to determine a shift to the power-saving mode has come or not. As a specific example, the condition of performing the shift determination at 0:00 on the 1$^{st}$ day of every month or the condition of performing the shift determination once every three months or once a week may be used.

In step S1802, the access history management module 136 obtains access history information about each page from the page management table 139.

Next in step S1803, the access history management module 136 sets the top page as the processing target.

In step S1804, the access history management module 136 judges whether the processing target page is accessed at low frequency or not. Incidentally, the standard for the low access frequency is a condition set in the storage system 100 in advance; and such a standard may be registered at the time of shipment or a condition set by the user via the GUI for the management terminal may be stored as such a standard.

A specific example of the condition is that the relevant page has not been accessed more than one month after the last access frequency judgment, i.e., no access history within one month has been recorded.

If it is determined as a result of the judgment in step S1804 that the processing target page is not accessed at low frequency, the access history management module 136 proceeds to step S1806.

On the other hand, if it is determined as a result of the judgment in step S1804 that the processing target page is accessed at low frequency, the access history management module 136 proceeds to step S1805.

In step S1805, the access history management module 136 determines page relocation. As a specific example, the access history management module 136 migrates the page, which was determined in step S1804 to have been accessed at low frequency, to the low access frequency area because the page has the low access frequency attribute.

In step S1806, the access history management module 136 judges whether or not the access frequency judgment processing has been completed for all the pages. If it is determined as a result of the judgment in step S1806 that the access frequency judgment processing has been completed for all the pages, the processing proceeds to step S1808.

On the other hand, if it is determined as a result of the judgment in step S1806 that the access frequency judgment processing has not been completed for all the pages, the access history management module 136 sets the next page as the target to be judged in step S1807 and then proceeds to the low access frequency judgment in step S1804.

In step S1808, the access history management module 136 executes the power-saving mode shift processing in relation to the page relocation for which the access frequency was determined to be low. As a specific example, the page which is the data migration source is shifted to the power-saving mode, and the low access frequency area which is the data migration destination is also shifted to the power-saving mode. The HDDs 191 that can be shifted to the power-saving mode are shifted to the power-saving mode so that power-saving will be achieved after completion of necessary relocation of all the pages.

A combination of the virtual LUs and the areas constituting the virtual LUs and the construction method may be free as long as the functions of the storage system permit.

Embodiments of the present invention have been described above. However, the invention is not limited to these embodiments and it is a matter of course that the invention can be modified unless the utilizations depart from the gist of the invention.

The invention claimed is:

1. A storage system comprising:
   a plurality of storage devices for storing data; and
   a controller connected to a host computer via a network for identifying access from the host computer, specifying the storage devices which should become targets of the access from among the plurality of storage devices, sending/receiving data to/from the specified storage devices, and controlling the plurality of storage devices according to a plurality of power modes;

wherein the controller selects, as the power mode, any one of the power modes including a normal mode, which makes each of the storage devices capable of processing an I/O request from the host computer, and a plurality of power-saving modes which make each of the storage devices incapable of processing an I/O request from the host computer and operate in a power-saving state with less power consumption than in the normal mode, wherein in the process of controlling each of the storage devices according to the selected power mode, the controller selects the storage devices, which should be controlled in any one of the power-saving modes, from among the storage devices operating in the normal mode in the plurality of storage devices, and before shifting to control the selected storage devices in any one of the power-saving modes, the controller sets a combination of power-saving modes that satisfies return conditions from each power-saving mode to the normal mode; and then the controller controls the selected storage devices in the set combination of power-saving modes;

wherein before shifting to control the selected storage devices in any one of the power-saving modes, the controller calculates a time and an electric power required to have the storage devices return from each of the power-saving modes to the normal mode; and based on each of the calculation values, the controller sets a combination of power-saving modes that satisfies the return conditions defined by a host timeout period of an I/O request and supplied power, wherein the power-saving mode is selected for a particular storage device such that the particular storage device can respond within a host timeout period to an I/O request sent from the host.

2. The storage system according to claim 1, wherein before shifting to control the selected storage devices in any one of the power-saving modes, the controller calculates the time and the electric power required to have the storage devices return from each of the power-saving modes to the normal mode; and based on each of the calculation values, the controller sets a combination of power-saving modes for the same power control unit as the combination of power-saving modes that satisfies the return conditions defined by a host timeout period and a supplied power; and the controller sets the number of times the power modes belonging to the combination are used for returning to the normal mode, and the number of storage devices to be controlled in the power modes belonging to the combination; and when accessing the selected storage devices in the process of controlling the selected storage devices in the set combination of power-saving modes, the controller executes control processing for making the selected storage devices return to the normal mode.

3. The storage system according to claim 1, wherein before shifting to control the selected storage devices in any one of the power-saving modes, the controller calculates time and electric power required to have the storage devices return from each of the power-saving modes to the normal mode; and based on each of the calculation values, the controller sets a combination of power-saving modes that satisfies the return conditions defined by the host timeout period and the supplied power, and the number of the storage devices to be controlled in the power modes belonging to the combination; and if the selected storage devices are categorized into a plurality of types according to the number of options for the power-saving modes that can be selected from the plurality of power-saving modes with different power consumption, the controller sets a priority rank for the storage devices of the type with a small number of options higher than the priority rank for those of the type with a large number of options as the storage devices to be controlled.

4. The storage system according to claim 1, wherein before shifting to control the selected storage devices in any one of the power-saving modes, the controller calculates time and electric power required to have the storage devices return from each of the power-saving modes to the normal mode; and based on each of the calculation values, the controller sets a combination of power-saving modes that satisfies the return conditions defined by the host timeout period and the supplied power, and the number of the storage devices to be controlled in the power modes belonging to the combination; and the controller constructs the selected storage devices in association with power management units; and if the selected storage devices are located and managed in any of plurality of chassis, the storage devices to be controlled are distributed to and located in the plurality of chassis in accordance with the number of storage devices that can return to the normal mode simultaneously on a chassis basis.

5. The storage system according to claim 1, wherein before shifting to control the selected storage devices in any one of the power-saving modes, the controller calculates time and electric power required to have the storage devices return from each of the power-saving modes to the normal mode; and based on each of the calculation values, the controller sets a combination of power-saving modes that satisfies the return conditions defined by the host timeout period and the supplied power, and the number of the storage devices to be controlled in the power modes belonging to the combination; and if physical storage areas of the selected storage devices are composed of a plurality of logical storage areas and the plurality of logical storage areas are managed by dividing them into a low access frequency area and a power-saving mode area, the controller distributes and locates the physical storage areas of the storage devices to be controlled, to and in the low access frequency area and the power-saving mode area in accordance with a frequency of access to each of the logical storage areas.

6. The storage system according to claim 1, wherein if return conditions defined by a host timeout period and a supplied power are used as the return conditions, and if a priority rank is set to the return conditions so that host response time is set as a higher priority than the supplied power, the controller sets the priority rank for the power-saving mode that satisfies reduction of the host response time, higher than the priority rank for the power-saving mode that satisfies a condition of the supplied power, among the combination of power-saving modes that satisfies the return conditions.

7. The storage system according to claim 1, wherein if return conditions defined by a host timeout period and a supplied power are used as the return conditions, and if a priority rank is set to the return conditions so that the supplied power is set as a higher priority than host response time, the controller sets the priority rank for the power-saving mode that satisfies a condition of the supplied power, higher than the priority rank for the power-saving mode that satisfies reduction of the host response time, among the combination of power-saving modes that satisfies the return conditions.

8. The storage system according to claim 1, wherein when accessing the selected storage devices in the process of controlling the selected storage devices in the set combination of power-saving modes, the controller executes control processing for making the selected storage devices simultaneously return to the normal mode; and if the execution of the control processing for making the selected storage devices return to the normal mode does not satisfy the return conditions, the controller executes control processing for dividing the selected storage devices into a plurality of sets and making them return to the normal mode separately in a plurality of steps within the range of the return conditions.

9. A power control method for a storage system including:
a plurality of storage devices for storing data; and
a controller connected to a host computer via a network for identifying access from the host computer, specifying the storage devices which should become targets of the access from among the plurality of storage devices, sending/receiving data to/from the specified storage devices, and controlling the plurality of storage devices according to a plurality of power modes;
wherein the controller executes:
a first section step of selecting, as the power mode, any one of the power modes including a normal mode, which makes each of the storage devices capable of processing an I/O request from the host computer, and a plurality of power-saving modes which make each of the storage devices incapable of processing an I/O request from the host computer and operate in a power-saving state with less power consumption than in the normal mode;
a second step of selecting the storage devices, which should be controlled in any one of the power-saving modes, from among the storage devices operating in the normal mode in the plurality of storage devices in the process of controlling each of the storage devices according to the power mode selected in the first selection step;
a first setting step of setting a combination of power-saving modes that satisfies return conditions from each power-saving mode to the normal mode before shifting to control the storage devices selected in the second selection step in any one of the power-saving modes;
a control step of controlling the storage devices selected in the second selection step in the set combination of power-saving modes after the first setting step;
a calculation step of calculating a time and an electric power required to have the storage devices return from each of the power-saving modes to the normal mode before shifting to control the storage devices selected in the second selection step in any one of the power-saving modes; and
a second setting step of setting, based on each of the calculation values calculated in the calculation step, a combination of power-saving modes that satisfies the return conditions defined by a host timeout period and a supplied power.

10. The storage system power control method according to claim 9, wherein the controller executes:
a calculation step of calculating the time and the electric power required to have the storage devices return from each of the power-saving modes to the normal mode before shifting to control of the storage devices selected in the second selection step in any one of the power-saving modes;
a second setting step of setting, based on each of the calculation values calculated in the calculation step, a combination of power-saving modes that satisfies the return conditions defined by a host timeout period and a supplied power, the number of times the power modes belonging to the combination are used for returning to the normal mode, and the number of storage devices controlled by the power modes belonging to the combination; and
a return step of, when accessing the storage devices selected in the second selection step in the process of controlling the storage devices selected in the second selection step in the set combination of power-saving modes, making the storage devices selected in the second selection step return to the normal mode.

11. The storage system power control method according to claim 9, wherein the controller executes:
a calculation step of calculating the time and the electric power required to have the storage devices return from each of the power-saving modes to the normal mode before shifting to control of the storage devices selected in the second selection step in any one of the power-saving modes;
a second setting step of setting, based on each of the calculation values calculated in the calculation step, a combination of power-saving modes that satisfies the return conditions defined by the host timeout period and the supplied power, and the number of storage devices to be controlled by the power modes belonging to the combination; and
if the selected storage devices are categorized into a plurality of types according to the number of options for the power-saving modes that can be selected from the plurality of power-saving modes with different power consumption, a third setting step of setting a priority rank for the storage devices of the type with a small number of options higher than the priority rank for those of the type with a large number of options as the storage devices to be controlled.

12. The storage system power control method according to claim 9, wherein the controller executes a second setting step of, if return conditions defined by the host timeout period and the supplied power are used as the return conditions, and if a priority rank is set to the return conditions so that the host response time is set as a higher priority than the supplied power, setting the priority rank for the power-saving mode that satisfies a condition of the host response time, higher than the priority rank for the power-saving mode that satisfies a condition of the supplied power, among the combination of power-saving modes that satisfies the return conditions.

13. The storage system power control method according to claim 9, wherein the controller executes a second setting step of, if return conditions defined by the host timeout period and the supplied power are used as the return conditions, and if a priority rank is set to the return conditions so that the supplied power is set as a higher priority than the host response time, setting the priority rank for the power-saving mode that satisfies a condition of the supplied power, higher than the priority rank for the power-saving mode that satisfies a condition of the host response time, among the combination of power-saving modes that satisfies the return conditions.

* * * * *